United States Patent
Shin et al.

(10) Patent No.: US 8,378,835 B2
(45) Date of Patent: Feb. 19, 2013

(54) REFRIGERATOR AND CONTROL METHOD THEREOF

(75) Inventors: Jong Min Shin, Seoul (KR); Ji Young Lee, Seoul (KR); Woo Hyun Paik, Seoul (KR)

(73) Assignee: LG Electronics Inc., Seoul (KR)

( * ) Notice: Subject to any disclaimer, the term of this patent is extended or adjusted under 35 U.S.C. 154(b) by 441 days.

(21) Appl. No.: 12/820,947

(22) Filed: Jun. 22, 2010

(65) Prior Publication Data

US 2011/0175742 A1 Jul. 21, 2011

(30) Foreign Application Priority Data

Jan. 20, 2010 (KR) .................... 10-2010-0005066
Feb. 9, 2010 (KR) .................... 10-2010-0012131
Mar. 2, 2010 (KR) .................... 10-2010-0018540

(51) Int. Cl.
*G08B 21/00* (2006.01)

(52) U.S. Cl. .................................................. 340/635

(58) Field of Classification Search ............... 340/635, 340/526, 539.3, 545.6, 585, 693.3; 62/186, 62/187

See application file for complete search history.

(56) References Cited

U.S. PATENT DOCUMENTS 4,924,680 A * 5/1990 Janke et al. ................. 62/187
5,931,004 A * 8/1999 Yoo et al. .................... 62/82
7,007,490 B2 * 3/2006 Jeong et al. ................ 62/179

FOREIGN PATENT DOCUMENTS

| JP | 2005-249358 A | 9/2005 |
| JP | 2005-333688 A | 12/2005 |
| JP | 2007-240027 A | 9/2007 |
| KR | 10-2008-0103768 A | 11/2008 |

* cited by examiner

*Primary Examiner* — Phung Nguyen
(74) *Attorney, Agent, or Firm* — Birch, Stewart, Kolasch & Birch, LLP

(57) ABSTRACT

A refrigerator and a control method of the refrigerator are discussed. According to an embodiment, a control method of a refrigerator connected to an electric power management network comprises steps of receiving power-rate information via the electric power management network; setting an over-cooling period and a power-saving period based on the received power-rate information; controlling at east one storage chamber to be over-cooled by over-cooling cold air during the over-cooling period; and controlling the other storage chamber to be over-cooled by the over-cooled cold air during the power-saving period. According to the present invention, the functions of the refrigerator are provided with minimal use of electricity and/or with reduced electricity charges.

20 Claims, 26 Drawing Sheets

REFRIGERATOR AND CONTROL METHOD THEREOF

CROSS REFERENCE TO RELATED APPLICATION

This application claims the priority benefits of the Korean Patent Application Nos. 10-2010-0005066 filed on Jan. 20, 2010, 10-2010-0012131 filed on Feb. 9, 2010, and 10-2010-0018540 filed on Mar. 2, 2010, which are all hereby incorporated by reference as if fully set forth herein.

BACKGROUND OF THE DISCLOSURE

1. Field of the Disclosure

The present invention relates to a refrigerator having an energy saving function and a control method of the refrigerator.

2. Discussion of the Related Art

Refrigerators are used to refrigerate or freeze food items by way of a refrigerant cycle. For this function, a refrigerator includes a cabinet having first and second storage chambers, an evaporator provided in the cabinet, a compressor for compressing a refrigerant, a condenser for condensing the refrigerant and an expansion device for lowering the pressure of the refrigerant and compressing the refrigerant.

The refrigerator including such configuration turns on and off its compressor periodically to maintain the temperatures inside the first and second storage chambers in a predetermined range.

This periodic operation of the compressor is implemented only in consideration of keeping the temperatures inside the first and second storage chambers at a certain range, but not in consideration of a variable-rate system which bills power rates per unit hour based on power demands. Herein, the phrase 'power rate' can be interchangeably used with a phrase 'electricity rate', e.g., rate at which the electricity is priced.

As concerns for energy saving and efficiency have been raised recently, introduction of smart grid for efficient power usage has been made in a power consumption market. If the smart grid is introduced, a variable-rate system which bills the power rates based on the power demands will be introduced.

Generally companies who provide power/electricity control and set the power rates for consumers and business. Power rates per unit hour in time, at times of high power consumption, will be increased noticeably under the variable-rate system than under a single-rate system. On the other hand, the power rates in time, at times of relatively less power consumption, will be decreased noticeably in comparison to the current rates.

As a result, to reduce the charges associated with the high power rates, it is recommended that the usage of electric appliances should be avoided as much as possible in those hours having the high power rates per unit hour while the electric appliances can be used more freely in those hours having the low power rates per unit hour.

According to the related art, as mentioned above, the periodical operation of the compressor in the refrigerator or other appliance is implemented regardless of the pay-by-time power rates. As a result, in case the compressor is put into operation during the peak hours of high power rates, the charges associated with the power use due to the high power rates will be noticeably and undesirable high and this can give economical and financial burden to the consumers and business disadvantageously.

SUMMARY OF THE DISCLOSURE

Accordingly, the present invention is directed to a refrigerator and a control method of the same.

An object of the present invention is to provide a refrigerator that is able to keep refrigerator functions with low costs and a method of controlling the refrigerator.

Another object of the present invention is to provide techniques for selectively directing cold air within a refrigerator or other digital appliance (e.g., AC) during a power saving period, which address the limitations and disadvantages associated with the related art.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a refrigerator comprising a plurality of storage chambers according to an embodiment of the invention includes a power-rate information receiving part connected to a smart grid network to receive power-rate information; a period setting part for setting an over-cooling period and a power-saving period (or energy-saving period) based on the received power-rate information; an over-cooling controller for generating over-cooling cold air during the over-cooling period to control at least one storage chamber over-cooled; and a power-saving controller for cooling the other storage chamber by way of the over-cooled cold air during the power-saving period to implement a smart power saving function.

The power-saving period may be set from the received power-rate information, in consideration of a high-power-rate time period.

The over-cooling period may be set in consideration of the time required to maintain the set power-saving period and the time required for the over-cooling.

The refrigerator may further include a cold air damper for moving cold air of the over-cooled storage chamber to the other storage chamber.

In another aspect of the present invention, a control method of a refrigerator connected to an electric power management network includes steps of: receiving power-rate information via the electric power management network; setting an over-cooling period and a power-saving period based on the received power-rate information; controlling at east one storage chamber to be over-cooled by over-cooling cold air during the over-cooling period; and controlling the other storage chamber to be over-cooled by the over-cooled cold air during the power-saving period.

The control method may further include a step of controlling opening and closing of a cold air damper to move cold air of the over-cooled storage chamber to the other storage chamber.

In a further aspect of the present invention, a refrigerator includes a cabinet comprising a plurality of storage chambers; a cold air damper provided between the storage chambers to make the storage chambers to communicate with each other selectively; a controller for receiving power-rate information, for setting an over-cooling period and a power-saving period based on the received power-rate information, for controlling at least one storage chamber to be over-cooled by generating over-cooled cold air during the over-cooled period, and for controlling the other storage chamber to be cooled by the over-cooled cold air by controlling the opening and closing of the cold air damper during the power-saving period.

The plurality of the storage chambers may include a first storage chamber and a second storage chamber having a temperature kept relatively higher than a temperature of the first storage chamber, and the controller implements over-cooling control to decrease the temperature of the first storage chamber a predetermined time before the power-saving period starts.

The controller may control a cold air damper provided between the first and second storage chambers to be open if the current time enters the power-saving period, and the controller may control the cold air damper to be open or closed repeatedly to control the temperature of the second temperature in a predetermined range during the power-saving period.

The refrigerator may further include a door handle which is able to recognize whether a user contacts there with; a display for displaying an operational status and operational information of the refrigerator; and an alarm for generating an audio signal, wherein the controller may display the over-cooling period operation or power-saving period operation on the display and the controller may operate the alarm when the user contacts with the door handle to generate the audio signal.

The refrigerator may further include a storage chamber cold air leakage preventing device provided in the storage chamber, the storage chamber cold air leakage preventing device comprising a spray nozzle for spraying air to prevent leakage of cold air inside the storage chamber, wherein the storage chamber cold air leakage preventing device may spray air to form an air curtain between an inside and an outside of the storage chamber, when the door is open.

In a still further aspect of the present invention, a control method of a refrigerator includes steps of: receiving power-rate information; identifying a high-power-rate time period in which a hourly-power-rate is billed to a predetermined amount or more; over-cooling at least one of storage chambers provided in the refrigerator, in case the current time is a predetermined time before the high-power-rate time period; and decreasing the power consumption of the refrigerator, in case the current time is in the high-power-rate time period, and communicating the over-cooled storage chamber with at least one of the other storage chambers.

In a still further aspect of the present invention, a control method of a refrigerator includes steps of: receiving power-rate information; identifying a high-power-rate time period in which a hourly-power-rate is billed to a predetermined amount or more; determining whether a power required to operate the refrigerator during the high-power-rate time period is able to be supplied by an auxiliary power supply; receiving the power from the auxiliary power supply during the high-power-rate time period, if the power is able to be supplied by the auxiliary power supply; and if the power is not able to supplied by the auxiliary power supply, communicating the over-cooled storage chamber with at least one of the other storage chambers when the high-power-rate time period starts, after over-cooling at least one of a plurality of storage chambers before the high-power-rate time period.

In a still further aspect of the present invention, a refrigerator includes a cabinet comprising a plurality of storage chambers; a cold air damper for communicating the plurality of the storage chambers with each other selectively; a power supply provided with the power by an electric power company or by an auxiliary power supply; and a controller for determining whether a power required to operate the refrigerator in a high-power-rate time period is able to be supplied by the auxiliary power supply; if the power is able to be supplied by the auxiliary power supply, for receiving the power from the auxiliary power supply during the high-power-rate time period; if the power is not able to be supplied by the auxiliary power supply, for controlling the cold air damper to communicate the over-cooled storage chamber with at least one of the other storage chambers when the high-power-rate time period starts, after over-cooling at least one of the plurality of the storage chambers.

The high-power-rate time period may be set to a time period recommended by an electric power company, a time period in which a recommended power-rate band is formed, a time period which is higher than a user-fixed-rate, or a time period distant from the highest rate in a predetermined ratio range on a received variable-power-rate system information.

According to the present invention, refrigerator preserving functions may be maintained with a minimal use of electricity having high power-rates.

Furthermore, under a variable-power-rate system in which a power-rate is variable hourly according to power demand, if the hourly-power-rate reaches a predetermined reference rate, that is, peak rate, in other words, if the current time enters a high-power-rate time period, an operation frequency of the compressor is decreased or the compressor is stopped. As a result, the accumulation power rate may be saved more than usual.

A still further, the reference rate determining the high-power-rate time period may be set by the user's intension or set according to a recommendation of an electric power company. As a result, the reference rate may be selectively set according to the user's circumstances.

A still further, in case an auxiliary power supply such as a self-generation facility (e.g. a solar power generation device) and a storage battery are provided, the refrigerator according to the present invention may be operated by way of the power supplied by this auxiliary power supply in the high-power-rate time period.

Because of that, in a state of operating the refrigerator according to a normal setting, the power supplied by an external power supply such as the electric power company may be reduced and the power-rate may be saved accordingly.

Moreover, the operation frequency of the compressor is temporarily increased right before the high-power-rate time period requiring the stopping of the compressor or decreasing the operation frequency enters, such that the compression amount of refrigerant may be increased and that a specific storage chamber may be over-cooled to decrease the temperature thereof at a predetermined temperature or lower. Then, after the current time enters the high-power-rate time period, the over-cooled storage chamber is in communication with the other storage chamber. As a result, the temperature of the second storage chamber may be prevented from increasing too high.

In a still further aspect of the present invention, a refrigerator having a plurality of storage units comprises a receiver for receiving an electricity rate information through a smart grid network, an identifying part for identifying an over-cooling period and an energy saving period based on the received electricity rate information, an over-cooling controller for controlling a storage unit to be over-cooled to generate over-cooled air during the over-cooling period, and an energy-saving controller for preserving a desired temperature of other storage units during the energy-saving period by using the over-cooled air.

In another aspect, the present invention provides a refrigerator comprising: a plurality of storage chambers including at least one first storage chamber and at least one second storage chamber; a power-rate information receiving part connected to a smart grid network and configured to receive power-rate information from the smart grid network; a period setting part configured to set an over-cooling period and a power-saving period based on the received power-rate information; an over-cooling controller configured to generate over-cooled cold air in the at least one first storage chamber during the over-cooling period; and a power-saving controller configured to cool the at least one second storage chamber in the power-saving period by selectively directing the over-cooled cold air from the at least one first storage chamber to the at least one second storage chamber during the power-saving period.

In another aspect, the present invention provides a method for managing use of electric power in a refrigerator of a smart grid system, the refrigerator including at least one first storage chamber and at least one second storage chamber, the method comprising: receiving, by the refrigerator, power-rate information from a smart grid network; setting an over-cooling period and a power-saving period based on the received power-rate information; supplying over-cooled cold air to the at least one first storage chamber of the refrigerator during the over-cooling period; and selectively directing the over-cooled cold air from the at least one first storage chamber to the at least one second storage chamber during the power-saving period.

In another aspect, the present invention provides an electric appliance comprising: a cabinet including a plurality of storage chambers; at least one cold air damper provided between the storage chambers to selectively open or close an air passage path between the storage chambers; a controller cooperating with the cold air damper and configured to: receive power-rate information, set an over-cooling period and a power-saving period based on the received power-rate information, control at least one of the storage chambers to be over-cooled by generating over-cooled cold air during the over-cooling period, and control at least one of the other storage chambers to be cooled by the over-cooled cold air from the over-cooled storage chamber by selectively opening and closing the air passage path using the cold air damper during the power-saving period.

In another aspect, the present invention provides a control method of a refrigerator including storage chambers, the method comprising steps of: receiving power-rate information; identifying a high-power-rate time period in which a hourly-power-rate is to be billed at a predetermined amount or more; over-cooling, by the refrigerator, at least one of the storage chambers provided in the refrigerator when a current time is at a predetermined time before the high-power-rate time period; decreasing, by the refrigerator, a power consumption of the refrigerator when the current time is within the high-power-rate time period; and providing, by the refrigerator, an air passage between the over-cooled storage chamber and at least another of the storage chambers when the current time is within the high-power-rate time period.

In another aspect, the present invention provides a control method of a refrigerator including storage chambers, the method comprising steps of: receiving power-rate information; identifying a high-power-rate time period in which a hourly-power-rate is to be billed at a predetermined amount or more; determining whether a power needed to operate the refrigerator during the high-power-rate time period is able to be supplied by an auxiliary power supply; receiving, by the refrigerator, the power from the auxiliary power supply during the high-power-rate time period if the determining step determines that the power is able to be supplied by the auxiliary power supply; and if the determining step determines that the power is not able to be supplied by the auxiliary power supply, providing by the refrigerator an air passage between the storage chambers when the high-power-rate time period starts, after over-cooling at least one of the storage chambers before the high-power-rate time period.

In another aspect, the present invention provides a refrigerator comprising: a plurality of storage chambers; a power supply control unit configured to direct power from either an auxiliary power supply or a main power supply; and a controller cooperating with the power supply control unit and configured to: receive power-rate information; identify a high-power-rate time period in which a hourly-power-rate is to be billed at a predetermined amount or more; determine whether a power needed to operate the refrigerator during the high-power-rate time period is able to be supplied by the auxiliary power supply; receive the power from the auxiliary power supply during the high-power-rate time period if the controller determines that the power is able to be supplied by the auxiliary power supply; and if the controller determines that the power is not able to be supplied by the auxiliary power supply, provide an air passage between the storage chambers when the high-power-rate time period starts, after over-cooling at least one of the storage chambers before the high-power-rate time period.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF THE EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
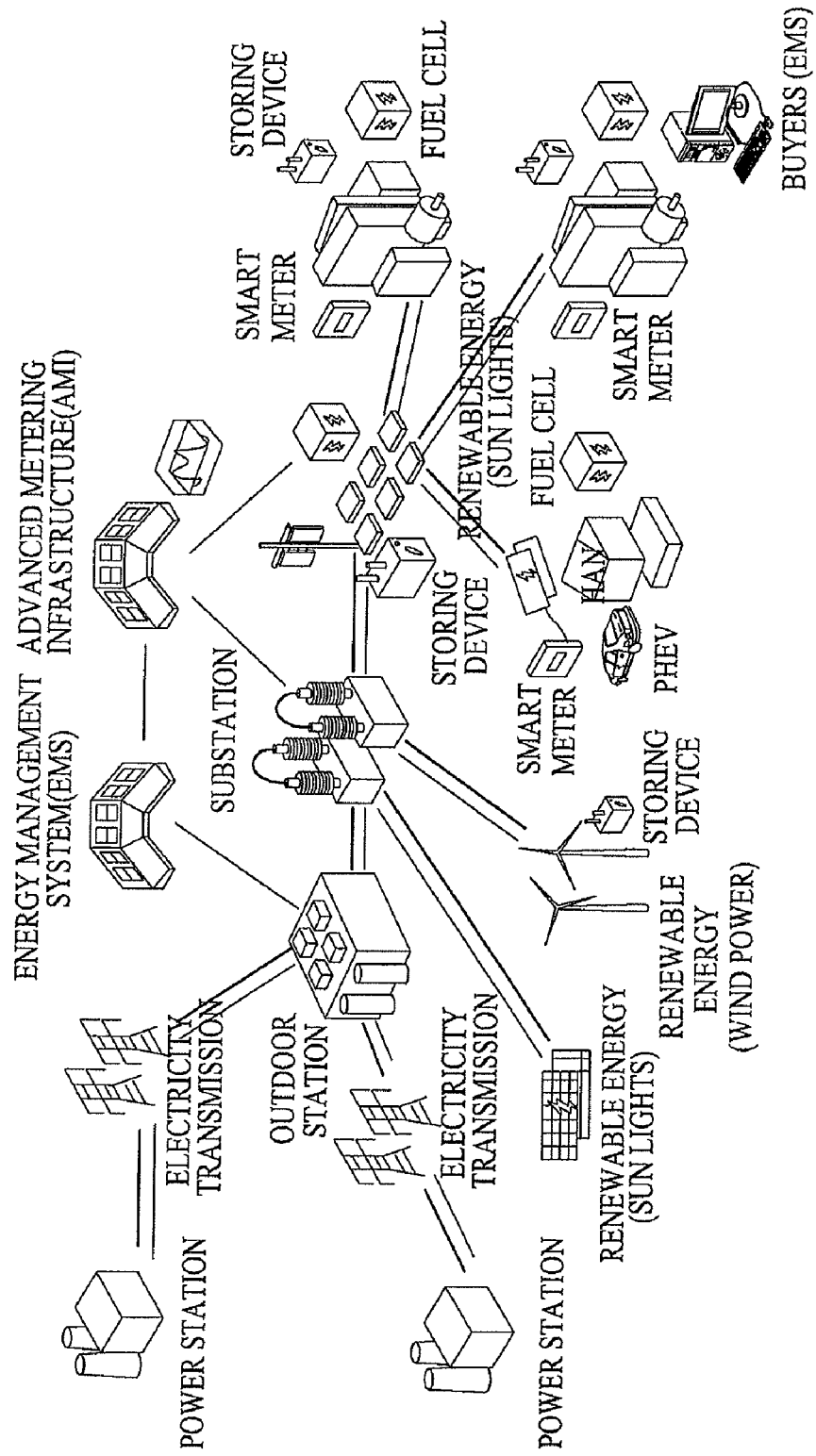
FIG. 1 is a diagram schematically illustrating a system representing Smart Grid according to an embodiment of the present invention.

FIG. 1 is a diagram schematically illustrating Smart Grid and Smart Grid includes an electric power station for generating electricity by way of nuclear power generation or hydroelectric power generation and a solar power station and a wind power station which use renewable energy such as sunlight and wind power. All the components of Smart Grid are operatively coupled and configured.

The electric power station, nuclear power station or hydroelectric power station transmits electricity to an outdoor station via a power cable and the outdoor station transmits the electricity to a substation to enable the electricity to be distributed to electricity buyers, for example, households, business, companies, offices, etc.

The electricity generated by renewable energy is transmitted to the substation to be distributed to each of the electricity buyer and the electricity transmitted from the substation can be distributed to each of offices and households via an electric power storage device.

Households using Home Area Network (HAN) may generate and supply electricity by using sunlight and a fuel cell mounted in PGEV (Plug in Hybrid Electric Vehicle) and they may sell remaining electricity to others.

With a smart metering infrastructure, an office, household, and other entities who use electricity may recognize the electricity/power rates used therein. Because of that, the users may take measures to reduce power consumption or power rates depending on the circumstances.

In the meanwhile, the power station, outdoor station, storage device and consuming places enable duplex transmission. As a result, the consuming places may not receive electricity unilaterally but notify their circumstances to the other electric power storage device, outdoor station and power stations to implement electricity generation and electricity distribution according to the circumstances.

EMS (Energy Management System) employed for real-time electric power management and real-time power consumption prediction and AMI (Advanced Metering Infrastructure) for real-time metering of the power consumption are used in Smart Grid.

Here, AMI under Smart Grid is a basic technology for integrating consumers based on open architecture and AMI enables the consumers to use electricity efficiently and the electric power suppliers to manage the system by detecting an error of the system.

Here, the open architecture is a reference for all kinds of electric appliances to be connected to each other in Smart Grid, regardless of manufactures thereof, in comparison to the conventional communication network.

As a result, the metering infrastructure used in the smart grid makes possible consumer-friendly efficiency such as 'Prices to Devices'. That is, a real-time price signal of the electric power market is delivered via EMS installed in each of the households and EMS communicates with each of the electric appliances to control it. As a result, the user recognizes electric power information of each of the electric appliances (which include electronic appliances) after seeing EMS, and the user implements an electric power information process, for example, power consumption or setting of power-rate limit based on the recognized power information.

Here, EMS may include a local EMS used in the offices or household and a center EMS for processing information acquired by the local EMS.

As the real-time communication related to the electric power information between the supplier and consumer is possible in the smart grid, a 'real-time Grid response' may be actualized and high expense costs for peak demands may be reduced.

Figure 2:
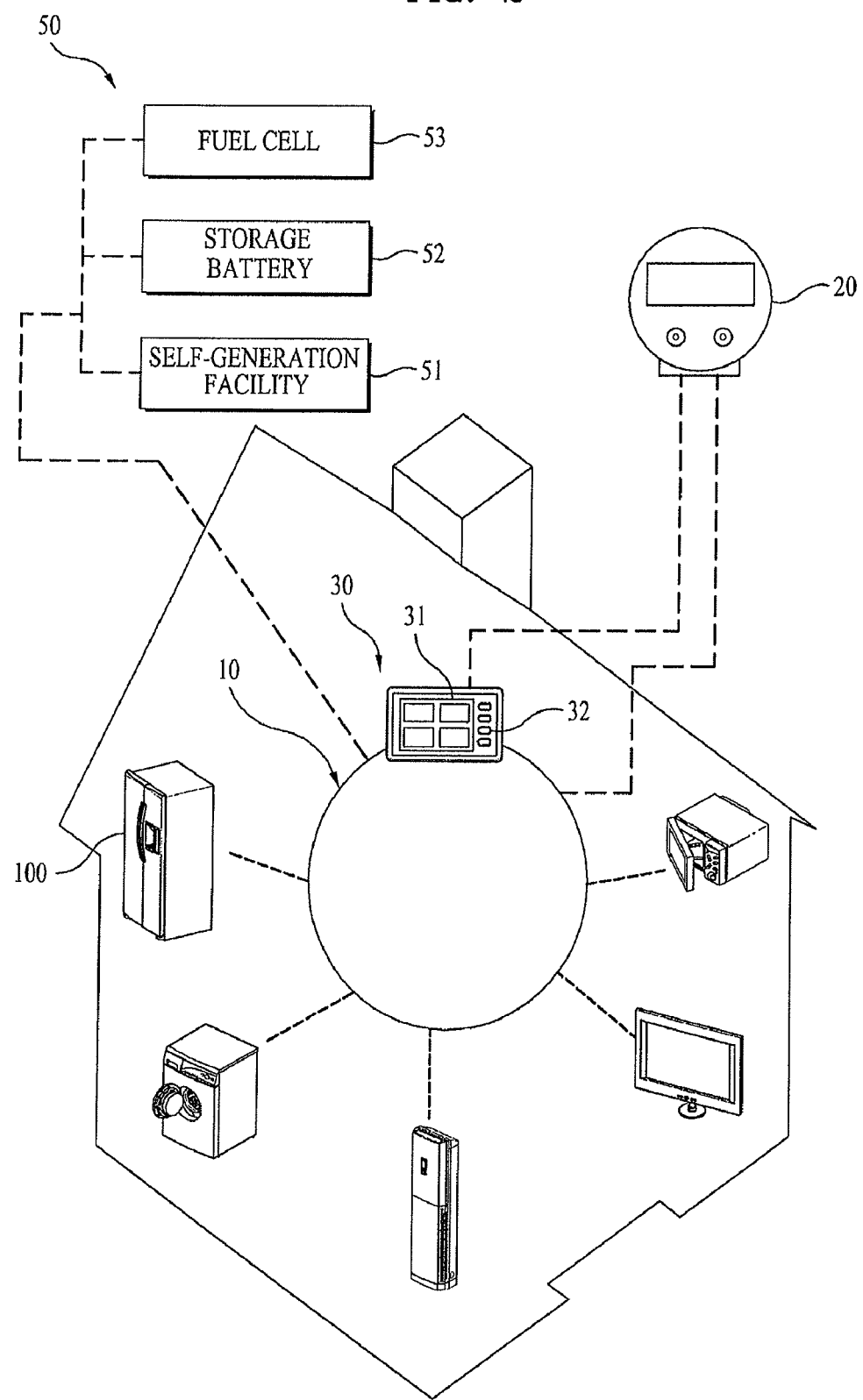
FIG. 2 is a diagram schematically illustrating a power management network of a house representing a refrigerator according to an exemplary embodiment of the present invention.

FIG. 2 is a diagram illustrating an electric power management network 10 used in the household which is a main consuming place of the smart grid, according to an embodiment of the invention. All the components of the electric power management network are operatively coupled and configured.

The electric power management network 10 includes a smart meter 20 capable of measuring the electric power supplied to each of the households and the power rates or EMS 30.

Here, the power rates may be billed to the consumers of electricity based on a pay-by-time system. Such pay-by-time power rates may be increased in those hours having radically increased power consumption and may be decreased in those hours having relatively less power consumption such as night hours.

The EMS 30 includes a screen 31 for displaying the current electricity consumption information and information on external environments, e.g. temperature and humidity, and a terminal having an input button 32 for allowing the user to operate.

The EMS 30 and/or smart meter 20 may be connected with an electric appliance such as a washer or dryer, an air conditioner, a refrigerator, a television and cooking device to duplex-communicate with them.

Communication inside the house may be implemented wirelessly or via wires such as PLC. Each of the electric appliances may be connected with the other electric appliances to implement communication.

The electric power management network 10 includes an auxiliary power supply 50 provided in the household, e.g., a self-generation facility 51 such as solar power generation device and a storage battery 52 capable of storing electric power generated in the self-generation facility.

Rather than the storage battery 52, a fuel cell 53 may be connected with the electric power management network 10 to be an auxiliary power supply.

Here, the auxiliary power supply 50 may supply the electric power to the household in a state when no electric power is supplied by an external power supply such as an electric power company.

The amount of electric power which can be supplied from the auxiliary power supply 50 or charted in the auxiliary power supply 50 may be displayed on the EMS 30 and/or the smart meter 20.

Figure 3:
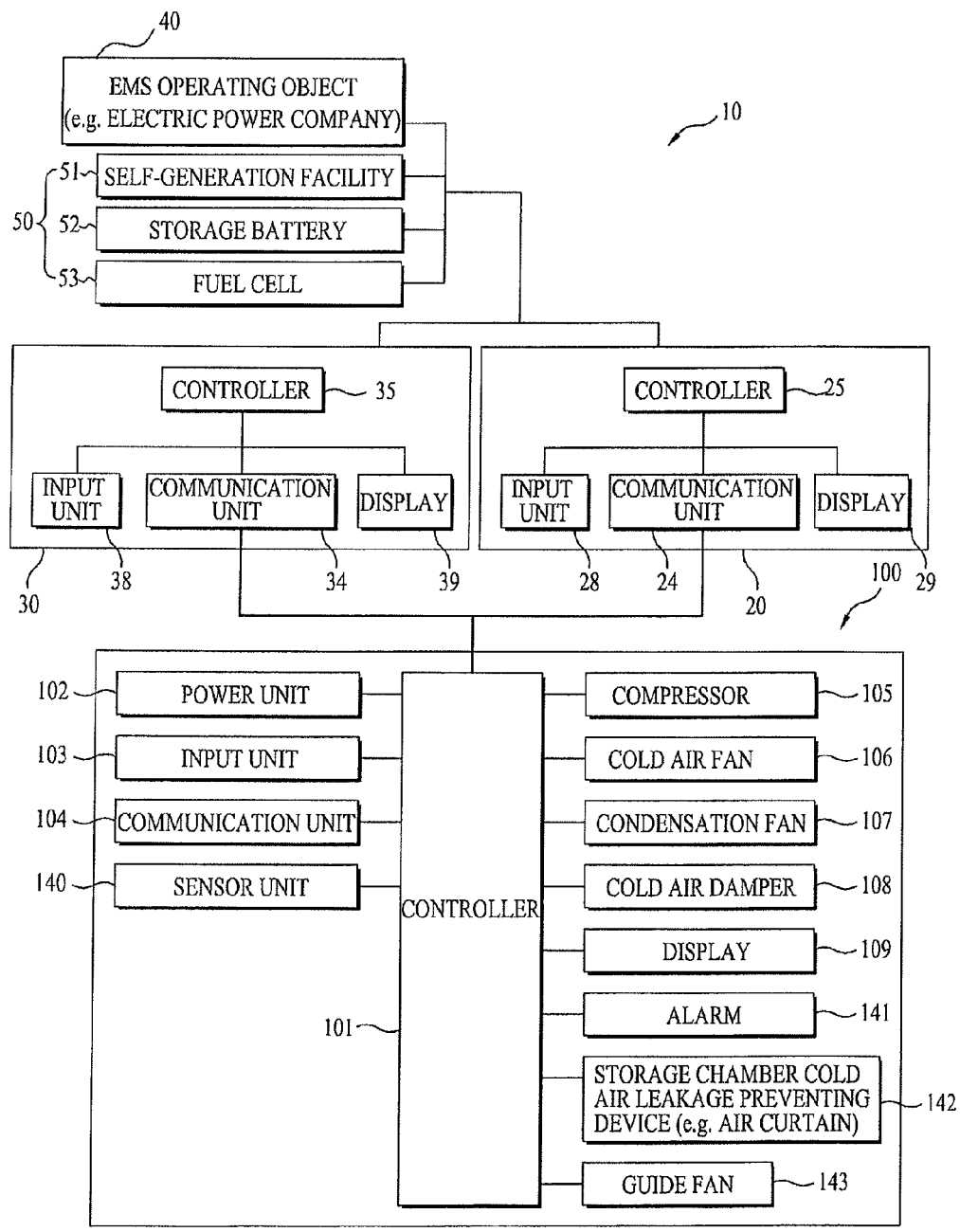
FIG. 3 is a control block diagram of the refrigerator and the power management network according to an embodiment of the present invention.

FIG. 3 is a control block diagram of the electric power management network 10 and a control block diagram of a refrigerator 100 connected to the electric power management network 10 according to an embodiment of the invention. All components of the network 10 and the refrigerator 100 are operatively coupled and configured.

Here, an electric power management program operating subject 40 may be an electric power company possessing the conventional power generation equipment (e.g. thermal, nuclear and hydroelectric power) or the power generation equipment using renewable energy (e.g. solar power, wind power and geothermal heat) and the present is not applicable thereto limitedly.

The electric power program operating subject 40 supplies not only the electric power but information related to a variable-rate (variable power/electricity rate) system to each household such that the household may map out a power-rate saving strategy according to the power-rate variation based on the information.

Moreover, the electric power program operating subject 40 provides guides for the user to use to reduce electricity-user charges and adopts or recommends a criterion of a high-power-rate period, which will be described later, to help the user's rational power consumption. As follows, an electric power supply possessed by the electric power management program subject 40 will be referenced herein as 'external power supply'.

As mentioned above, the electric power management network 10 includes the auxiliary power supply 50 which can be provided in each of the households, e.g., the self-generation facility 51 such as solar heat generation facility, the storage battery 52 and the fuel cell 52.

Here, the auxiliary power supply 50 is independent from the external power supply and supplies the electric power to the household, independent from the external power supply. The auxiliary power supply 50 and the external power supply are connected with the smart meter 20 and the EMS 30 to communicate with them. The smart meter 20 and the EMS 30 are provided, which communicate with the electric appliances of the household. As a result, each of the electric appliances may be designed to include a power supply unit capable of receiving the external power supply and/or auxiliary power supply.

Here, the EMS 30 includes a controller 35, an input unit 38, a communication unit 34 and a display 39. The smart meter 20 includes a controller 25, an input unit 28, a communication unit 24 and a display 29.

Here, the EMS 30 and the smart meter 20 are connected with the refrigerator 100 to communicate with the refrigerator. For instance, the EMS 30 and the smart meter 20 may access data stored in the refrigerator 100 and may send signals to control the refrigerator 100 and receive signals output from the refrigerator 100. For such communicable connections, a communication unit 104 is provided in the refrigerator 100 to communicate with the communication unit 34, 24 of the EMS 30 or the smart meter 20.

The communication unit 104 provided in the refrigerator 100 may receive power information such as real-time variable information related to the power-rates from the EMS or the smart meter 20.

The refrigerator 100 includes a controller 101, a power unit 102 connected to the controller 101, an input unit 103, the communication unit 104, a compressor 105 for compressing refrigerant, a cooling fan 106 for blowing the cold air generated from an evaporator having the depressed and expanded refrigerant drawn therein to a plurality of storage chambers, and a condensation fan 107 for cooling the condenser.

A cold air damper 108 is provided between a first storage chamber and a second storage chamber of the refrigerator to move the air between the first and second storages such that the air may be mixed.

Also, a display 109 is provided at an outside or other location of the refrigerator to display various data and information such as a status of the refrigerator 100 and the electric power information such as current power consumption and power-rate information.

A sensor unit 140 is connected with the controller 101 and the sensor unit 140 is preferably mounted on a door handle of a door of the refrigerator, but can be disposed at another location. If the user holds the door handle of the refrigerator, the sensor unit 140 recognizes this holding and provides appropriate signals to the controller 101.

An alarm 141 is connected to the controller 101 and the alarm 141 notifies the user's holding of the refrigerator door while the refrigerator is put into an over-cooling operation or an operation during a high-power-rate time period which will be described later, to advise the user to avoid frequent opening of the refrigerator door during those operations.

According to embodiments, the over-cooling operation is that the refrigerator is driven to lower the temperature of a specific storage chamber under a temperature generated by the normal driving of the refrigerator. The over-cooling period is a time period during which the over-cooling operation is performed. The high-power-rate time period is a time period in which the power-rate per hour is high, highest or increased noticeably than a reference rate because of general heavy demands of electric power during that time by households. The high-power-rate time period can also be a peak power rate time period. The high-power-rate time period or the peak power rate timer period is an example of a power saving period during which or by which the electric power use is reduced or minimized.

The over-cooling operation and the high-power-rate time period will be described later in reference to corresponding drawings and graphs.

A storage chamber cold air leakage preventing device 142 provided in the storage chamber is connected to the controller 101 and the storage chamber cold air leakage preventing device 142 prevents cold air inside the storage chamber from leaking outside if the refrigerator door is open during the over-cooling operation of the refrigerator or the operation of the refrigerator in the high-power-rate time period.

The storage chamber air leaking preventing device 142 may be configured to include an air curtain device provided in a rim of the storage chamber's entrance, but is not limited thereto according to the present invention.

A guide fan 143 is provided to facilitate moving of cold air from the storage chamber to the other areas smoothly and the guide fan 143 is put into operation if the cold air damper 108 starts to open.

Here, the controller 101 is employed to control the above components. Especially, the controller 101 controls the operational status of the compressor 105 and the opening status of the cold air damper 108 in consideration of the power-rate information transmitted by the communication unit 104, which is variable according to each time period under the variable-rate system.

Specifically, the controller 101 receives the power-rate information from, e.g., an electric power company via the electric power management network, and sets an over-cooling period and a power-saving period based on the received power-rate information. The controller 101 generates overcooled air during the over-cooling period to control one of the storage chambers to be overcooled and uses the overcooled air to control or cool the other storage chamber(s) of the refrigerator during the power-saving period.

As a result, in consideration of the operation of the controller 101, the controller 101 may be configured to include a power-rate information receiving part for receiving the power-rate information, a period setting part for setting the over-cooling period and the power-saving period based on the received power-rate information, an over-cooling control part for generating over-cooled cold air to control at least one of the storage chambers to be over-cooled during the over-cooling period, and a power-saving control part for cooling the other storage chambers by using the over-cooled cold air to implement a smart power-saving function during the power-saving period.

This embodiment presents that the operation of the controller is implemented for itself and it is one of variable embodiments to embody the present invention. Alternatively, the operation of the controller may be implemented by external control means provided outside the refrigerator, e.g. the smart meter 20 or the EMS 30 mentioned above. That is, under the circumstances of having the electric power management network, the control device provided therein integrates all of the electric appliances (including the refrigerator according to the present invention) on the network to implement the power-saving control to save or reduce electricity charges.

The power-saving period is set in consideration of the high-power-rate hours identified in the received power-rate information and the over-cooled period is set in consideration of the time required to maintain the set power-saving period and the time required in the over-cooling. The power-saving period (e.g., high/peak power rate time period) and the over-cooling period will be described later in more detail.

Figure 4:
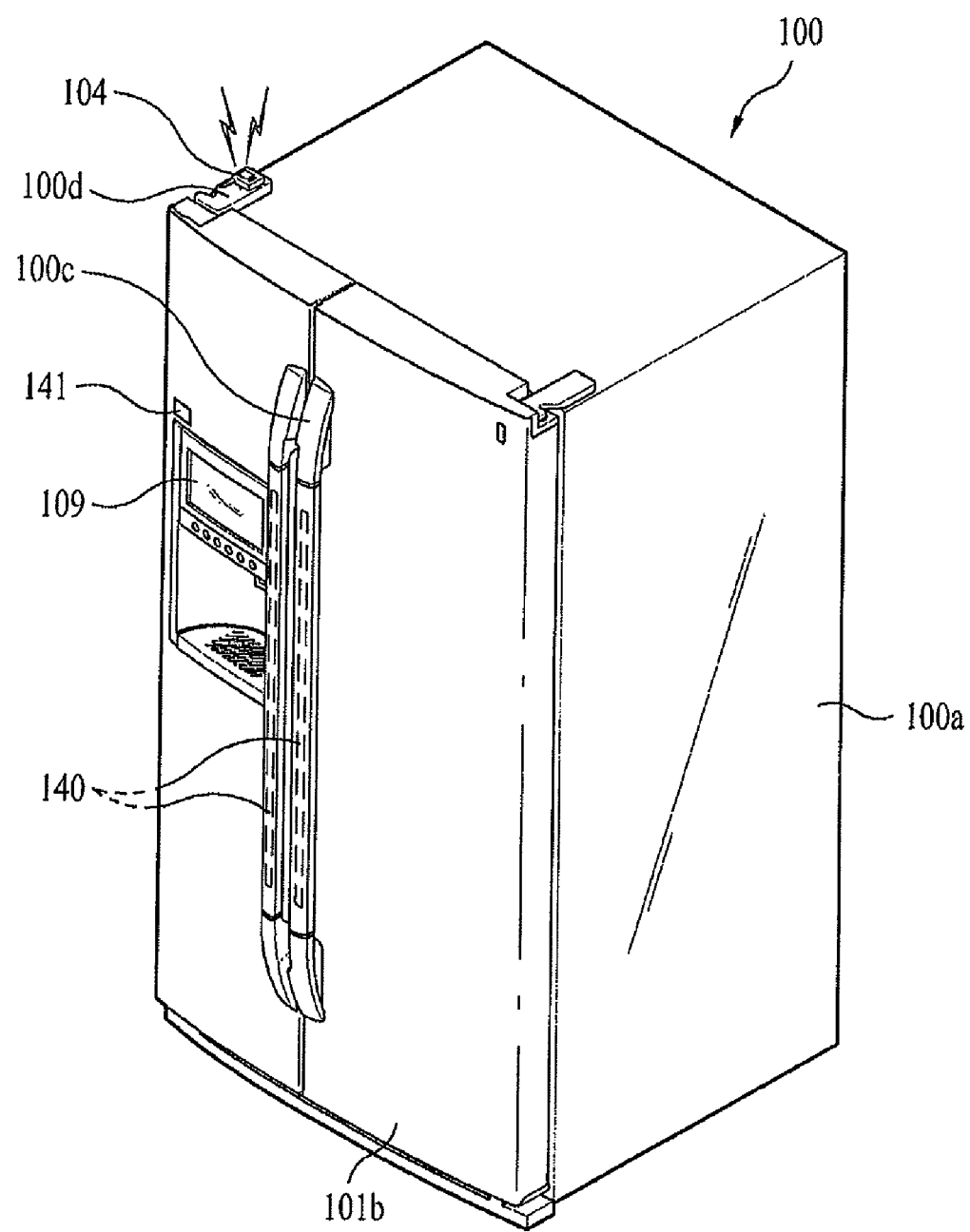
FIG. 4 is a perspective view illustrating the refrigerator according to an embodiment of the present invention.

FIG. 4 is a perspective view of the refrigerator 100 according to the present invention. As shown in FIG. 4, a door 100b is provided in a front of a cabinet 100a to open and close the storage chambers. A door handle 100c is provided on the door 100b for the user to hold and move the door.

Here, the sensor unit 140 can be mounted on the door handle 100c or other location to recognize whether the user holds the door handle 100c. The sensor 140 may be configured to be a pressure sensor, a heat sensor or a touch sensor and more than one sensor may be provided in the refrigerator.

The display 109 can display various information associated with the refrigerator. As such, the user can see the temperature inside the storage chamber and see whether the storage chamber is put into the over-cooling operation or the high-power-rate time period operation.

The alarm 141 is also mounted on the door 100b or other location and may be provided to be a speaker type to generate an audio signal.

The door 100b is connected with the cabinet 100a by a hinge device 100d and the communication unit 104 is provided in the hinge device 100d or other location. The communication unit 104 is configured to include a wireless communication modem (modulator-demodulator) such that the controller (101, see FIG. 3) and may communicate with outside (e.g., with the external devices within the household or outside the house) and transmit and receive diverse information.

Figure 5:
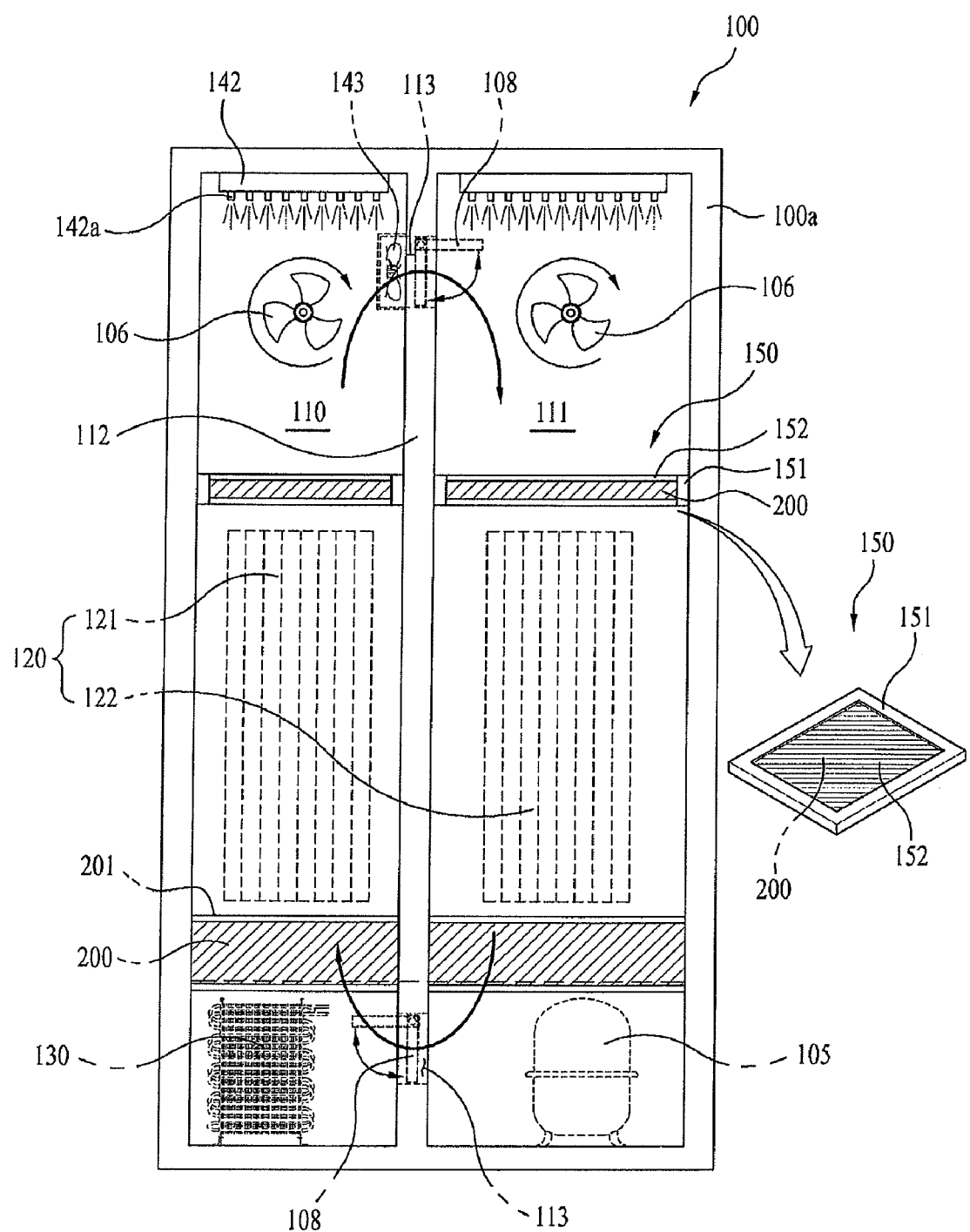
FIG. 5 is a sectional view illustrating an inner structure of the refrigerator according to an embodiment of the present invention.

As shown in FIG. 5, the cabinet 100a of the refrigerator 100 is partitioned off into a first storage chamber 110 and a second storage chamber 111. A partition wall 112 is provided between the first storage chamber 110 and the second storage chamber 111. Here, more storage chambers may be further provided in addition to the first and second storage chambers 110 and 111, and such storage chambers may be partitioned.

Communication openings 113 are provided in upper and lower portions of the partition wall 112 to make the air of the first storage chamber 110 communicate with (or mix with) the air of the second storage chambers 110 and 111 and vice versa. One or more cold air dampers 108 are provided in each of the communication openings 113.

The cold air damper 108 opens the communication opening 113 according to a command of the controller (101, see FIG. 3). The guide fan 143 is provided adjacent to the communication opening 113 to fan the cold air of the first storage chamber 110 to move towards the second storage chamber 111 when the cold air damper 108 opens the communication opening 113.

First and second storage chamber evaporators 121 and 122 are provided in rear walls of the first and second storage chambers 110 and 111, respectively. Here, it is possible to install a single evaporator only in the first storage chamber 110.

The cold air fans 106 are provided beyond the first and second storage chamber evaporators 121 and 122 to draw cold air generated by the evaporators into the first and second storage chambers 110 and 111, respectively.

The storage chamber cold air leakage preventing devices 142 are provided at inner walls of the first and second storage chambers 110 and 111, respectively. The storage chamber cold air leakage preventing devices 142 prevent air inside the storage chambers from leaking outside when the door (100b, see FIG. 4) is opened, as mentioned above.

The storage chamber cold air leakage preventing device 142 may be configured to be an air curtain device including a nozzle 142a for spraying air to each entrance portion of the first and second storage chambers 110 and 111, such that air curtain may be formed at the entrances of the first and second storage chambers 110 and 111 to shut off air flow between the first and second storage chambers and outside. For instance, the air curtain can be formed in a border between the insides of the first and second storage chambers 110 and 111 and the outside only to prevent the heat-exchange of internal air of the storage chambers and external air.

A cold-air containing material 200 is provided in each of the first and second storage chambers 110 and 111 to keep cold air inside the storage chambers in as latent heat. If each temperature of the first and second storage chambers 110 and 111 are increased up to a predetermined temperature or more, the cold-air containing material 200 can take the heat out of the air inside the storage chambers to further cool the air in the storage chambers 110 and 111.

It is commonly preferable that the cold-air containing material 200 is configured to be made with salt water or other chemical materials. If the refrigerator is put into a normal operation, the cold-air containing material 200 is frozen and if a peripheral temperature is increased, it is dissolved to absorb any external heat.

The cold-air containing material 200 may be kept in a containing case 201 provided in each of the storage chambers, so that the cold-air containing material 200 is used for the first and second storage chambers 110 and 111 effectively.

Alternatively, the cold-air containing material 200 may be provided in each of shelves 150 provided in the first and second storage chambers 110 and 111. The shelf 150 is configured to include a frame 151 and a tempered glass 152 provided in the frame 101. The cold-air containing material 200 can be provided in the tempered glass 152. A plurality of shelves 150 may be provided in the first and second storage chambers 110 and 111, respectively.

If the first storage chamber 110 is functioned as a freezing chamber and the second storage chamber 111 as a refrigerating chamber, a freezing point of the cold-air containing material 200 provided in the first storage chamber 110 should be different from a freezing point of the cold-air containing material 200 provided in the second storage chamber 111, and a configuration of a material composing the cold-air containing material 200 for the first storage chamber 110 should be different from a configuration of a material composing the cold-air containing material 200 for the second storage chamber 111.

Approximately, the cold-air containing material 200 provided in the first storage chamber 110 may be a material that is able to be frozen approximately at −18° C., for example, salt water and the cold-air containing material provided in the second storage chamber 111 may be configured of a material that is able to be frozen approximately at 3~4° C.

According to an embodiment, the cold-air containing materials are preferably the materials with different freezing points. If the temperatures of the storage chambers are higher than those freezing points, the cold-air containing materials are dissolved to take out the heat of the air inside the storage chambers 110 and 111 such that the increase of the temperatures inside the storage chambers may be dull.

The condenser 130 is provided in a lower portion of the cabinet 100a of the refrigerator 100 and is connected with the compressor to condense the refrigerant discharged from the compressor 105.

The compressor 105 may be configured to be an inverter compressor capable of changing a driving frequency.

In case the refrigerator is driven normally according to this embodiment, the temperature of the first storage chamber 110 may be designed to be substantially lower than that of the second storage chamber 111. For example, the first and second storage chambers 110 and 111 may be configured to be freezing and refrigerator chambers, respectively. This is because it is better to provide the user with wide selections according to characteristics of storing objects.

Figure 6:
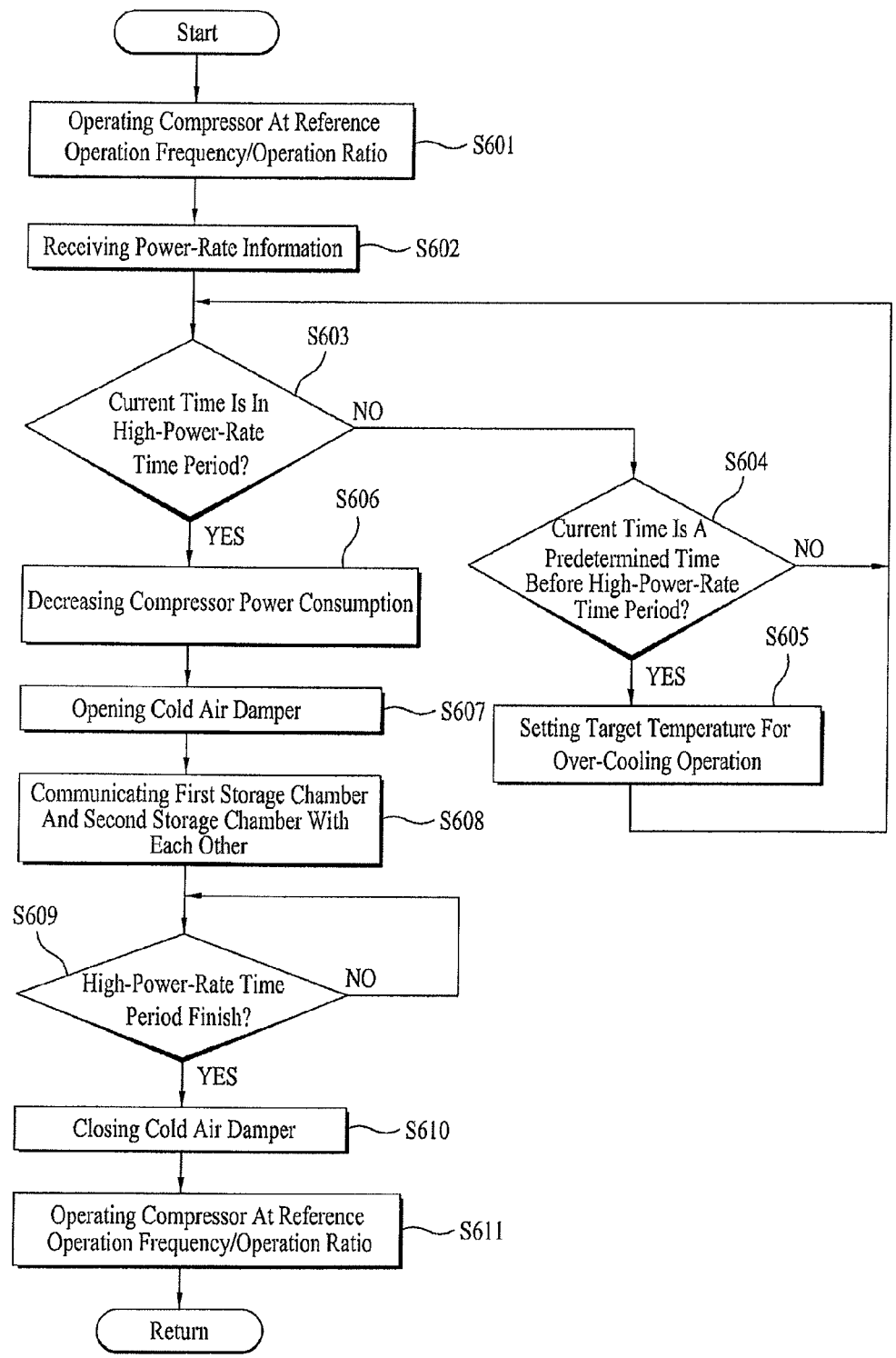
FIG. 6 is a flow chart illustrating a control method of the refrigerator according to a first embodiment of the present invention.

A control operation of the refrigerator having the above configuration will be described in reference to FIG. 6 as follows. The methods of FIG. 6 and other figures are implemented in the refrigerator of FIG. 5, but can be implemented in other refrigerators or electronic appliances.

The compressor is put into operation at a reference operation frequency to freeze or refrigerate objects stored in the first and second storage chambers (S601). Information on power rates that are variable dependent on time is received from the power electric company or electric power service company (S602).

Figure 25:
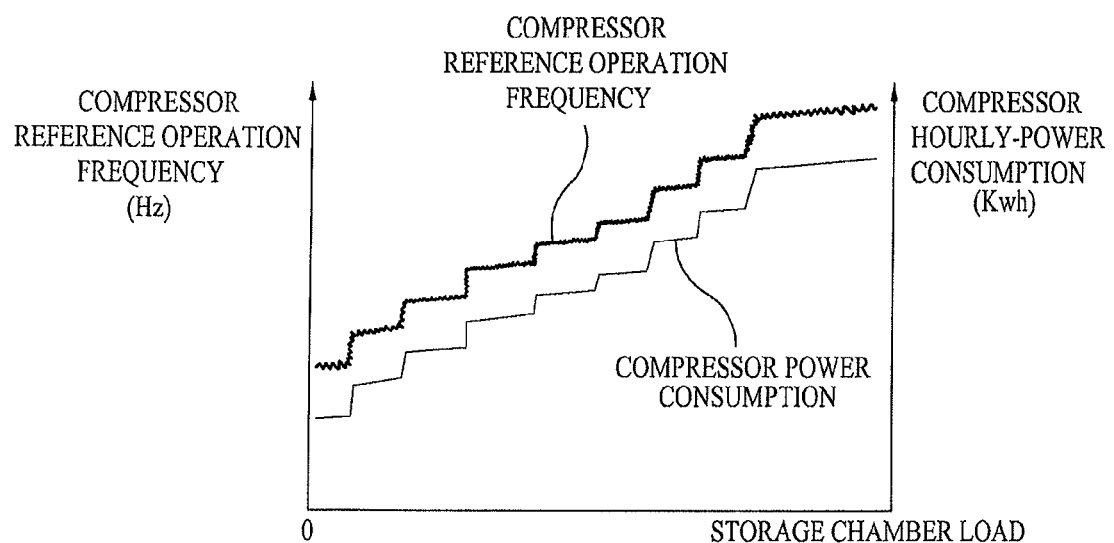
FIG. 25 is a graph illustrating changes in the driving frequency of a compressor and power consumption based on the changes in load applied to a storage chamber according to an embodiment of the present invention.

Here, the reference operation frequency is referenced hereto as a frequency needed to maintain the freezing or refrigerating maintenance capability of the storage chambers uniformly in a predetermined range based on load inside the storage chambers (e.g., temperature and volumes of storing objects, as shown in FIG. 25).

The reference operation frequency is not fixed in predetermined frequencies and is increased or decreased according to the change of load. As the load (objects stored) inside the storage chambers of the refrigerator is increased more and more, the reference operation frequency increases correspondingly as shown in FIG. 25. Because of that, the electricity consumed by the compressor may be increased.

The refrigerant compressed by the compressor is drawn into the evaporator after being condensed and expanded. The temperatures inside the first and second storage chambers may be maintained at predetermined keep-freezing and keep-refrigerating temperatures, respectively.

At this time, the controller 101 determines whether the current time corresponds to the high-power-rate period in which the hourly power-rate is billed at a predetermined high reference power-rate or more (S603).

Figure 26:
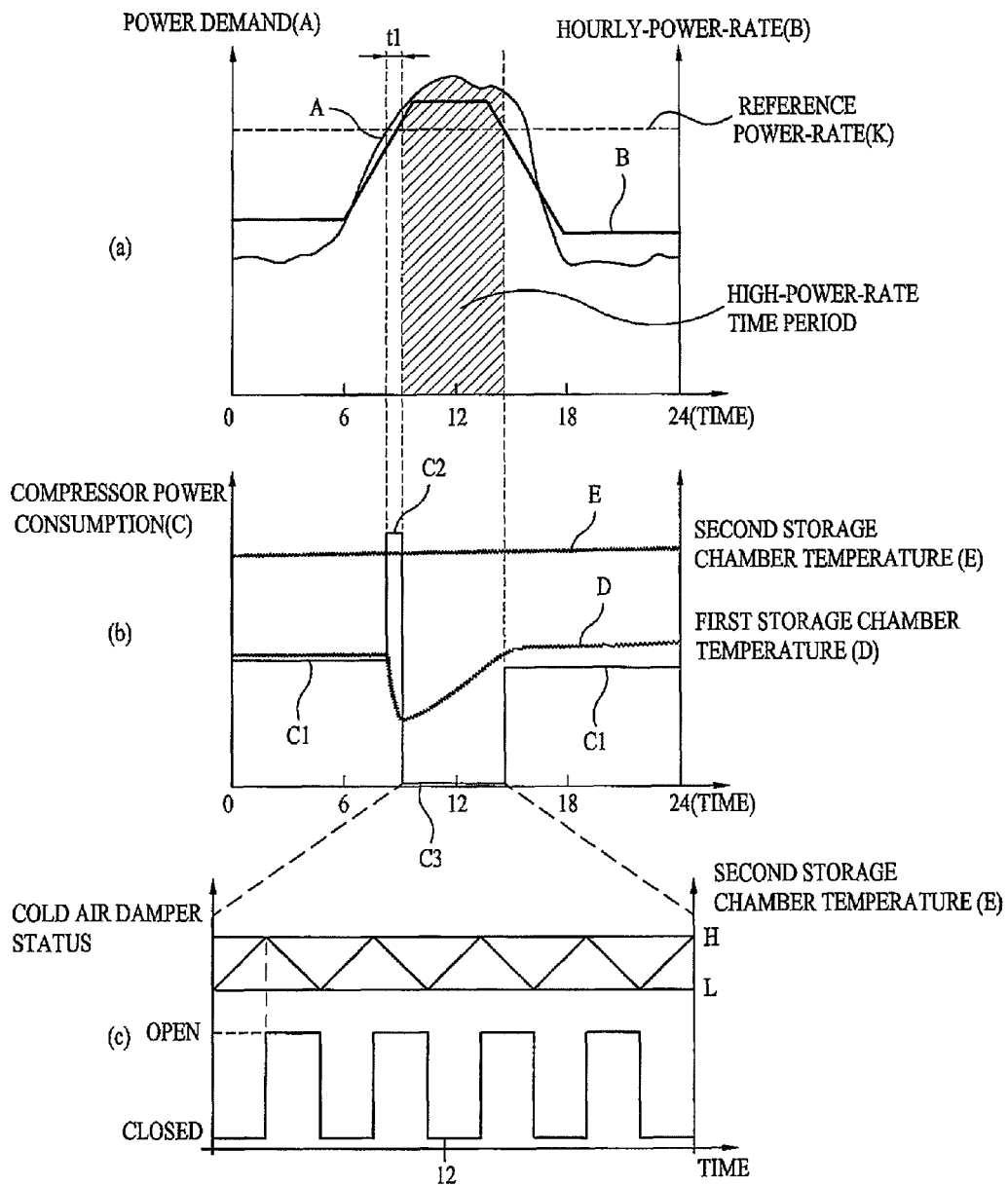
FIG. 26(a) is a graph illustrating an example of a change in power rates based on time changes and power-rate changes according to an embodiment of the present invention.
FIG. 26(b) is a graph illustrating an example of operational changes in the compressor of the refrigerator and temperature changes of each storage chamber of the refrigerator based on the time changes and power-rate changes according to an embodiment of the present invention.
FIG. 26(c) is a graph illustrating an example of an operational condition of a cold air damper of the refrigerator based on temperature changes of a second storage chamber of the refrigerator according to an embodiment of the present invention.

As shown in FIG. 26(a), since the use of electricity during a certain time period (e.g., in the morning and evening for the refrigerator when more people are present in the house) varies, the electricity company sets different power rates for different time periods of a day. For instance, the electricity company may charge a consumer a first power rate for morning and evening hours while charging a second power rate (which may be higher than the first power rate) for the afternoon hours. The power rate can indicate an amount of money to be charged to the consumer per a unit of electricity used. Then the high-power-rate time period is a time period during which a higher power rate applies than other time periods of a day/year. In the example of FIG. 26(a). the high-power-rate time period in which the hourly power-rate (B) is at or higher than a predetermined reference rate (K) in a state of the hourly power-rate (B) changing according to the power demands (A).

The predetermined reference power-rate (K) as the reference for the high-power-rate time period can be a peak-time rate having the highest power-rate among 24 hours or a power-rate distant from the peak-time rate at a predetermined ratio. For example, if the peak-time power rate is 500 Koean Won per 1 kwh or $0.5/1 kwh, this rate may be the reference rate or 450 Korean Won (or $0.45/1 kwh) distant from this peak-time rate approximately −10% may be the reference rate.

According to FIG. 26(a), the high-power-rate time period is referenced to as oblique lines. If the power/electricity is consumed in these hours, the power rate may be increased noticeably in comparison to the power consumed in the other time periods. Thus, the power-saving period mentioned above may be set in this high-power-rate time period.

If the current time is not in the high-power-rate time period, the power consumption of the compressor does not have to be increased. If the power consumption of the compressor is decreased or stopped after the current time enters the high-power-rate time period, the temperature of the first or second storage chamber may be increased too much because of the remarkable decrease in the refrigerant compression amount and the keep-freezing or refrigerating function of the refrigerator may be not implemented appropriately.

To address this limitation, the controller 101 determines whether the current time is a predetermined time prior to the high-power-rate time period (S604). If the current time is a predetermined time prior to the high-power-rate time period based on the result of the determination, a target temperature for the over-cooling operation with respect to the first storage chamber is set. The operation frequency of the compressor or operation ratio, which is a ratio of the time taken to be an on-status from the overall operation time, is then increased to increase the compression amount of refrigerant, to implement the over-cooling according to the set target temperature for the over-cooling operation. That is, when the current time is a set time before the high-power-rate time period, the refrigerator is driven so that over-cooled cold air is provided in the first storage chamber.

After that, the temperature of the first storage chamber is drastically decreased right before the current time enters the high-power-rate time period (S605). If commonly the temperature of the first storage chamber is to be maintained at −18° C., a target temperature for step S605 may be set at −25° C.~−30° C. before the over-cooling operation.

As shown in FIG. 26(b), the compressor is driven in a reference operation frequency region (C1) and the operation frequency of the compressor is increased up to C2 for a time period (t1) right before the high-power-rate time period. Here, the operation ratio may be increased, too.

If the compression amount of refrigerant is increased because of the increase of the operation frequency or operation ratio for the compressor, the temperature (D) of the first storage chamber may be decreased drastically for the time period (t1) so as to reach the target temperature set in step S605.

If it is determined that the current time is the start of the high-power-rate time period after the step of S603, with the operation frequency of the compressor increased up to C2, the power consumption of the compressor may be decreased to save or reduce the use of electricity (S606).

The reference operation frequency (C1) is uniform after the over cooling operation as shown in FIG. 26(b) and it means that the load of the storage chambers is maintained uniformly. If the load change is noticeable, the reference operation frequency (C1) may be increased drastically or as needed as shown in a graph of FIG. 25.

The step of the decreasing the power consumption of the compressor includes a step of decreasing the operation frequency or operation ratio of the compressor or stopping the operation of the compressor. In this regard, the operation frequency of the compressor may be decreased down to a value noticeably lower than the reference operation frequency (C1) and this may also be applicable to the operation ratio of the compressor.

If the operation of the compressor is stopped or the operation frequency of the compressor is the value noticeably lower than the reference operation frequency (C1), the cold air formed by way of the refrigerant may not be formed or formed little only to increase the temperatures of the first and second storage chambers.

Here, the increased temperature of the first storage chamber is similar to or lower than the temperature when the compressor is driven at the reference operation frequency (C1) or operation ration as shown in FIG. 26(b), because the operation frequency of the compressor is increased temporarily like in the step S604.

As a result, the freezing function of the first storage chamber is provided well but the temperature of the second storage chamber may increase because of an external temperature of the refrigerator. To address this, the cold air damper is opened (S607). By opening of the cold air damper, the first storage chamber is in communication with the second storage chamber such that the overly cold air of the first storage chamber may move to the second storage chamber (S608), which in turn lowers the temperature of the second storage chamber.

In the meanwhile, if the cold-air containing material is provided in each of the first and second storage chambers as mentioned above, the cooling of the cold-air containing material may prevent the increase of the temperature inside each of the first and second storage chambers.

If the temperature of the second storage chamber is lowered too much, it may be necessary to close the cold air damper. However, preferably the cold air damper is opened in order to guide the cold air of the first storage chamber to the second storage chamber or vice versa.

Hence, the controller 101 determines whether the current time is after the high-power-rate time period (S609). If it is determined that the current time is after the high-power-rate time period, the cold air damper is closed to stop the cold air of the first storage chamber from moving into the second storage chamber (S610).

Then the compressor of the refrigerator is operated at the reference operation frequency or operation ratio to compress the refrigerant normally in order to induce the formation of cold air by way of low-temperature refrigerant (S611).

According to the control method of the refrigerant according to the first embodiment of the present invention, if power-rate information is received, the power saving period is determined based on the received power-rate information and the over-cooling period is set after the determined power-saving period to reduce power consumption and/or high electricity bills. Hence, the over-cooling cold air to be used after the power-saving period is generated and at least one storage chamber is controlled to be over-cooled with the over-cooled cold air during the over-cooling period. If the power-saving period comes after the over-cooling period, the temperature of the other storage chamber(s) not over-cooled is controlled to be maintained in a predetermined desirable range by using the over-cooled cold air.

More specifically, according to the control method of the refrigerator according to the first embodiment of the present invention, if power-rate information is received, the high-power-rate time period in which the hourly-power-rate is billed higher than a predetermined rate may be identified. If the current time is a predetermined time before the high-power-rate time period, one or more of the storage chambers provided in the refrigerator are over-cooled. If the current time falls within the high-power-rate time period, the electricity use by the refrigerator (e.g., compressor) is decreased and the over-cooled storage chamber is controlled to be in communication with at least one of the other storage chambers so that the over-cooled air in the storage chamber(s) is moved towards the other storage chambers(s) and used to cool them with minimal use of electricity.

In reference to FIG. 7 and the next drawings, a specific control flow of the control method of the refrigerator according to the present invention will be described.

Figure 7:
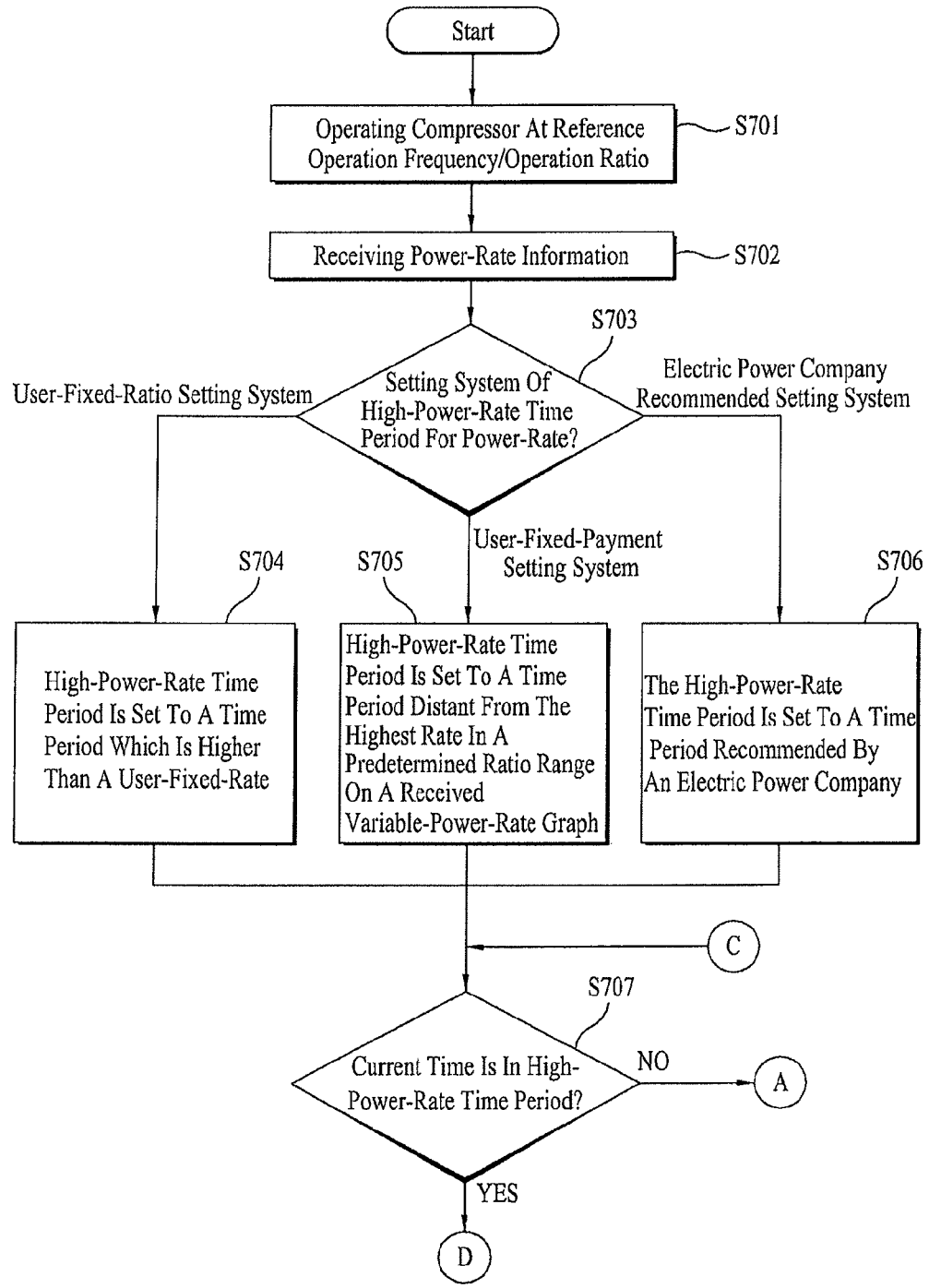
FIGS. 7 to 12 are flow charts illustrating control methods of the refrigerator according to a second embodiment of the present invention.
Figure 8:
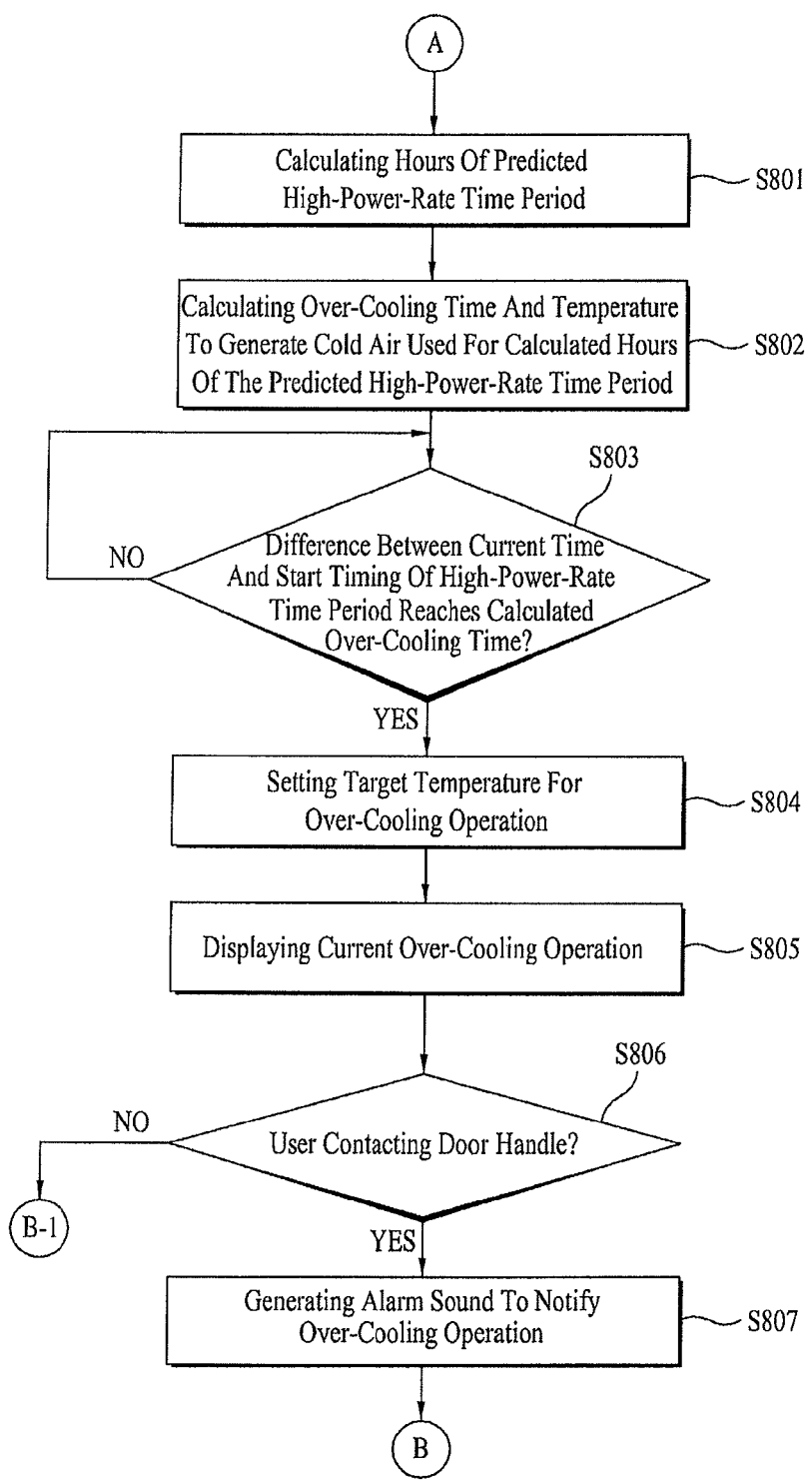

As shown in FIG. 7, cold air is supplied to each of the storage chambers, with the compressor being operated at the reference operation frequency or operation ratio, such that the keep-freezing or refrigerating function may be implemented (S701). After that, information on the power-rate is received from the power electricity company or power electricity service company (S702).

The received information includes information related to an hourly-power-rate which is variable according to a change of power demands.

The controller of the refrigerator or the controller of the EMS determines how a high-power-rate time period for the current power-rate is set (S703).

Here, the setting system of the high-power-rate time period includes a user-fixed-ratio system, a user-fixed-payment setting system, a power-company recommendation system and the like.

According to the user-fixed-ratio system, a power-rate distant from a peak-rate at a preset ratio on a power-rate graph provided by the electric power company may be set as reference rate as shown in FIG. 26(a). The current power-rate in a time period beyond the reference rate and the time period will be set as high-power-rate time period. For instance, under this setting system, if a hourly-power-rate shown in the graph provided by the electric power company is 500 Korean won and the preset ratio is 10%, the time period in which the power-rate is at or greater than 450 Korean won is set as the high-power-rate time period (S704).

Here, it is premised that the information on the power-rate change such as the power-rate graph would be provided to the refrigerator a day or several days before the effective date.

According to the user-fixed-payment system, as it means literally, a time period in which the power-rate is billed higher than a reference rate fixed by the user may be set as the high-power-rate time period (S705).

Lastly, according to the power-company recommendation system, the power-rate is provided on a power management program provided by the electric power company. The electric power company recommends a time period, a reference power-rate, a reference power-rate band or a time period having been determined suitable in consideration of movement of power demand change based on the time, movement of hourly-power rate change and power demand history of a household and the like. A time period beyond this recommended time period is set as the high-power-rate time period (S706). Here, the reference rate band is a value between the lowest value and the highest value of the power-rate fixed by the electric power company. The highest value will be a power-rate at a peak of power demand and the lowest value will be a preset value lower than the peak.

The time period having the reference power-rate band located therein is a time period in which the value between the lowest value and the highest value forming the rate-band is included. That is, the power-rate is moved between the highest and the lowest rates in 24 hours and this movement can be formed in a time period from, e.g., 10 a.m. to 3 p.m. This time period may be the time period having the reference power-rate band located therein and may be set as the high-power-rate time period.

If the reference with respect to the high-power-rate time period is determined (e.g., controller 101) based on one of the setting systems at steps S704 to S706, it is determined whether the current time is in the set high-power-rate time period (S707).

If it is determined that the current time is not in the high-power-rate time period at step S707, the controller calculates how many hours are there in the high-power-rate time period predicted based on the received power-rate information and/or the graph (S801).

The over-cooling time and over-cooling target temperature are calculated to generate cold air which will be used in the calculated hours of the predicted high-power-rate time period (S802).

The operation of decreasing the power consumption by the refrigerator is implemented during the high-power-rate time period and the operation frequency of the compressor is decreased noticeably or the operation of the compressor is stopped accordingly. Because of that, cold air may not be supplied to the storage chambers suitably. To address this, over-cooling of the storage chamber is implemented right before the high-power-rate time period to maintain the temperature of each storage chamber uniformly during the high-power-rate time period.

Here, the over-cooled air has to be kept in the storage chamber having the lower temperature and according to this embodiment, the over-cooling of the first storage chamber may be implemented because the first storage chamber has the relatively lower temperature.

For the over-cooling operation, more refrigerant may have to be supplied by the compressor more than usual and the cold air fan may be rotated fast to supply cold air fast.

Such the over-cooling operation can mean an increase of the power consumption and thus it is important to select a start timing of the over-cooling operation accordingly.

If the operation time and the temperature of the over-cooling operation are calculated, it is determined whether a difference between the current time and a starting timing of the high-power-rate time period reaches the over-cooling time (S803).

For example, assume that the temperature of the first storage chamber is maintained at −18° C. normally and the over-cooling operation has to be continued until the temperature in the first storage chamber reaches −30° C., with the time required for the over-cooling operation being determined to be 30 minutes.

At this time, assume that the start timing of the high-power-rate time period is 11 a.m. as indicated on the power-rate graph. If the current time is 10:20 a.m., there is 40 minutes of time difference between the current time and the start of the high-power-rate time period and thus the over-cooling operation may not be implemented yet.

However, if the current time is 10:30 a.m., the difference is then 30 minutes and this time difference corresponds to the time required for the over-cooling operation (30 minutes) mentioned above. As such the over-cooling operation may start at this time.

If the target temperature for the over-cooling operation is set and the over-cooling operation for accomplishing the target temperature is implemented as discussed above, the operation frequency or operation ratio of the compressor is increased and the rotation number of the cold air fan is increased as well (S804).

If the operation frequency of the compressor and the rotation number of the cold air fan are increased, the power consumption by the refrigerator may be increased more than usual. However, the increase of power rate generated by the increased consumption may be noticeably lower than increase of a power-rate which will be generated in case the refrigerator is operated under an original set condition during the high-power-rate time period. As such, the present invention provides savings to the consumers without sacrificing the use of the refrigerator.

The cold-air containing material may be frozen by the over-cooling cold air generated by the above over-cooling operation.

In reference to FIG. 26(b), the over-cooling operation for the first storage chamber is not implemented in C1 and is implemented in C2 which is a time period requiring the over-cooling operation. As a result, the operation frequency or operation ratio of the compressor is increased and the temperature of the first storage chamber is quick-cooled accordingly.

Once the over-cooling operation starts, the display on the refrigerator displays that the over-cooling operation is implemented in the first storage chamber or otherwise notify the users of the refrigerator (S805).

Hence, it is determined whether the user contacts the refrigerator door to open the refrigerator (S806). Here, the sensor part provided on the door handle of the refrigerator door may determine the door contact. Specifically, this determination can be performed by the sensor part of the door handle provided in the door for opening the first storage chamber.

If it is determined that the user contacts the refrigerator door, it means that the user desires to open the refrigerator door and thus an alarm sound is generated to notify and warn the user that it is not recommended to open the refrigerator door during the over-cooling operation (S807). At the same time, the display may display a visual message of such the warning.

Figure 9:
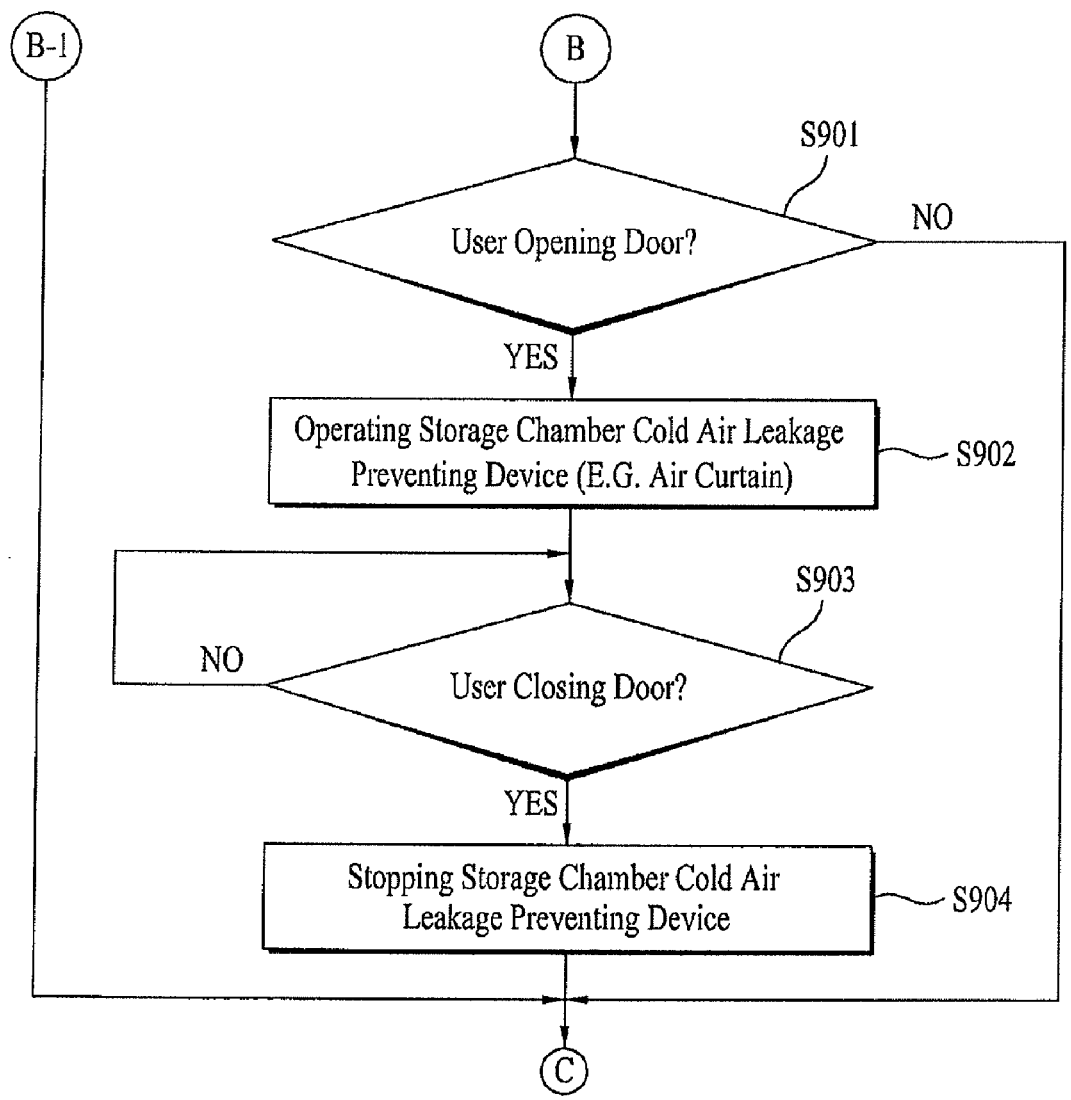

As shown in FIG. 9, it is determined whether the user opened the refrigerator door even after being alerted about the over-cooling operation (S901). If it is determined that the door is opened, the storage chamber cold air preventing device is operated (S902). As mentioned above, the air curtain may be formed in the entrance of the first storage chamber to shut off flow between external air and the air inside the storage chambers so as prevent leakage of cold air from the storage chamber (S902).

If the open status of the door is continued, the storage chamber cold air preventing device is operated continuously and at the same time it is determined whether the door is closed (S903). If the door is detected to be closed, the storage chamber cold air leakage preventing device is stopped (S904).

Figure 10:
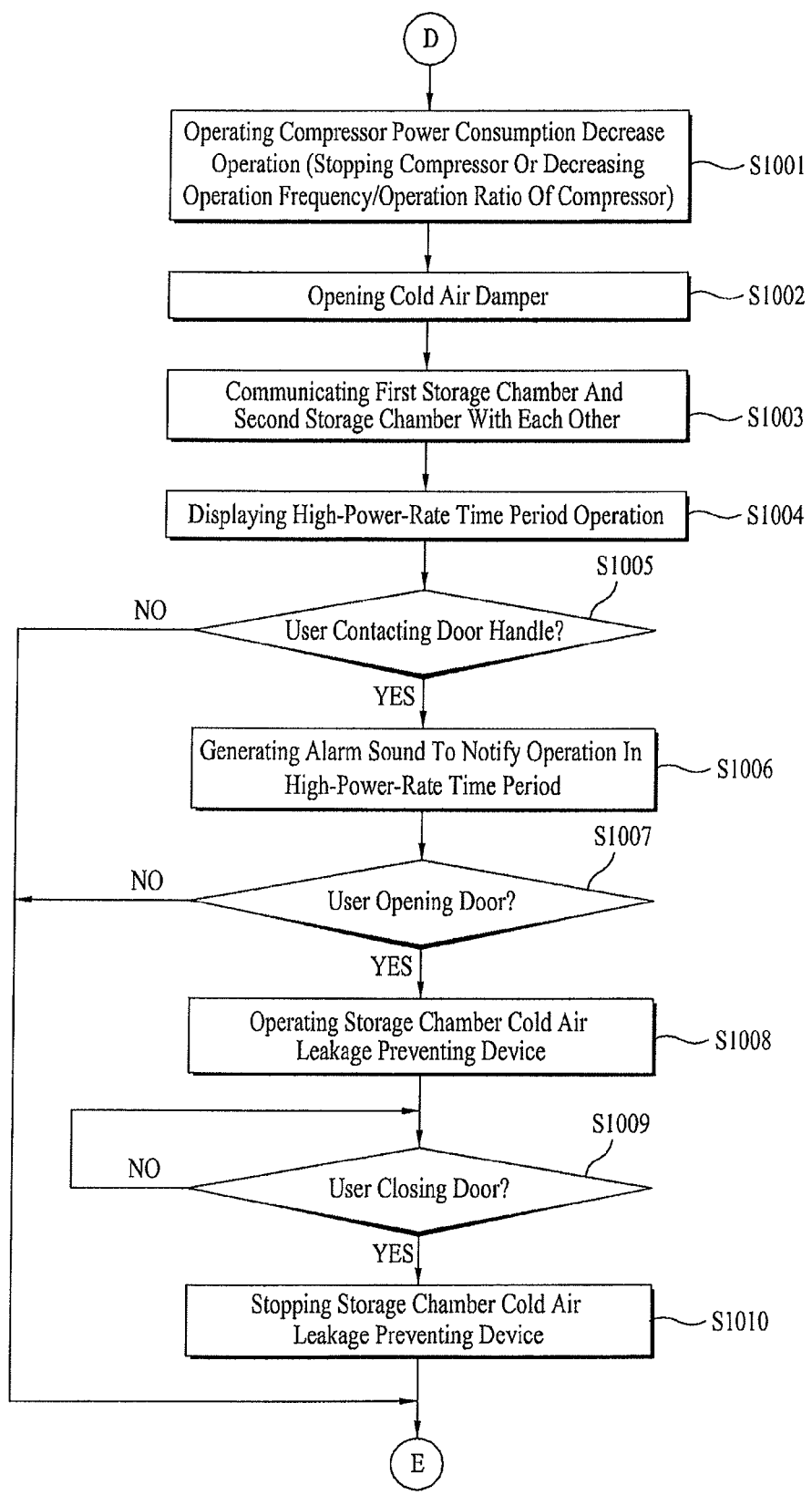
Figure 11:
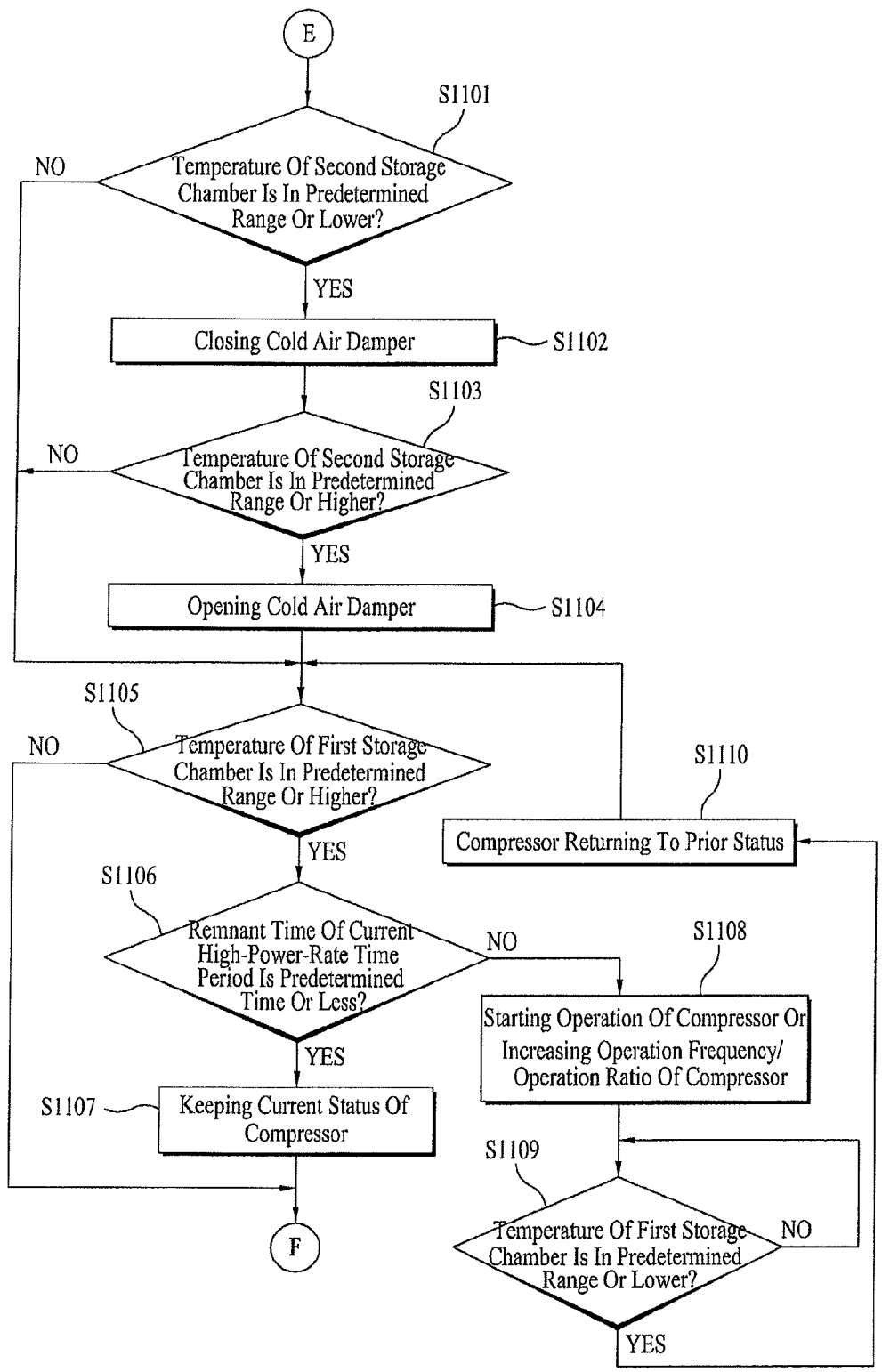

Then the method returns to step S706 of FIG. 7 where it is determined whether the current time is in the high-power-rate time period. If it is determined that the current time is in the high-power-rate time period, the power consumption decreasing operation of the compressor is implemented as shown in FIG. 10 (S1001).

Here, the power consumption decreasing operation of the compressor stops the compressor or decreases the operation frequency or operation ratio noticeably, with only generating the least cold air.

The cold air damper provided in the partition wall provided between the first and second storage chambers is opened (S1002) and the first storage chamber is in communication with the second storage chamber (S1003), such that cold air inside the first storage chamber may move into the second storage chamber smoothly.

Cold air having a noticeably lower temperature than usual is received into the first storage chamber because of the over-cooling operation is performed right before the current time enters the high-power-rate time period.

The cold air may be used to keep the temperature of the first storage chamber from increasing up to a predetermined temperature or higher and also to keep the temperature of the second storage chamber from increasing up to a predetermined temperature. Here, the increase of the temperature generated by the cold-air containing material provided in each of the first and second storage chambers may be minimal, compared with the increase of the temperature without the cold-air containing material.

If the second storage chamber is configured with a refrigerating chamber controlled to have a temperature above freezing, it is preferable to transmit the cold air by way of the over-cooling operation mentioned above and to implement the cooling operation of the cold-air containing material. This is because the refrigerating chamber is subject to an external temperature of the refrigerator more than the freezing chamber and because the temperature increase of the refrigerating chamber is larger than that of the freezing chamber.

Power-rate change in the high-power-rate time period is shown in FIG. 26(a) and the compressor operation frequency change and the temperature change of the first and second storage chambers are shown in FIG. 26(b).

It is most preferable that the temperature of the second storage chamber is maintained within a predetermined range by the operation of the cold air damper and the temperature of the first storage chamber is not over a predetermined temperature during the high-power-rate time period (C3).

The display 109 displays that the current time is in the high-power-rate time period and that the refrigerator is put into operation during the high-power-rate time period (S1004).

Hence, it is determined whether the user contacts the refrigerator door, specifically, whether the user holds the door handle (S1005).

If the user holds the door handle, it is determined that the user desires to open the door and the alarm sound is generated to notify the user about the operation of the refrigerator during the high-power-rate time period (S1006).

If it is determined that the user opened the door (S1007), the storage chamber cold air leakage preventing device is operated to prevent leakage of cold air as discussed above (S1008).

If is determined whether the door is re-closed after the door is opened by the user (S1009). If the door is closed, the operation of the storage chamber cold air leakage preventing device is stopped (S1010).

In the meanwhile, if the temperature of the second storage chamber can be lowered too much because of the opening of the cold air damper, in the state of the first and second storage chambers in communication with each other, then measures may be taken to avoid any significant cold-air damage to the objects stored in the second storage chamber.

For instance, it is determined whether the temperature of the second storage chamber is at a predetermined temperature or less (S1101). If so, the cold air damper is closed to shut off the cold air supplied from the first storage chamber temporarily (S1102). Because of that, the communication status between the first and second storage chambers is changed.

In the meanwhile, if the temperature of the second storage chamber is at a predetermined temperature or more, with the cold air damper closed, the keep-refrigerating function may not be provided well. To prevent that, it is deter mined whether the temperature of the second storage chamber is at a predetermined temperature or more (S1103) and if so, the cold air damper is opened (S1104).

The relation between this operation of the cold air damper and the temperature of the second storage chamber is shown in FIG. 26(c).

The second storage chamber receives cold air from the first storage chamber to adjust the temperature therein. However, it is important for the first storage chamber to implement its function suitably according to the amount of cold air over-cooled before the high-power-rate time period and the temperature of the cold air. If the amount and temperature of over-cooled cold air fails to satisfy a predetermined criterion, necessary measures can be provided for the first storage chamber.

Because of this, it is determined whether the temperature of the first storage chamber is at a predetermined temperature, for example, −18° C. or higher. If it is determined that the temperature of the first storage chamber is at the predetermined temperature or higher, it is determined whether a remaining time of the high-power-rate time period equals a predetermined time or less (S1106).

Even if the refrigerator is operated normally after the high-power-rate time period in case the remnant time of the high-power-rate time period is several minutes, the keep-refrigerating or freezing function may be affected. Because of that, this step of determining the remnant time is used.

For instance, if it is determined that the remnant time equals a predetermined time or less, the current status/operation of the compressor may be kept. That is, if the compressor is stopped, the compressor may be stopped continually and if the operation frequency of the compressor is in the minimum range, the same status may be kept (S1107).

However, if the remnant time is more than the predetermined time, the keep-refrigerating and freezing function may be compensated. For instance, if the compressor has to be operated unavoidably or it is operated at the minimum range operation frequency or operation ratio because the over-cooled cold air generated by the over-cooling operation right before the high-power-rate time period is insufficient, the operation frequency or operation ratio of the compressor is increased up to a predetermined value (S1108).

If the temperature of the first storage chamber is at a predetermined temperature or lower because of the above step (S1109), the compressor returns to a prior status such as the stopped status or the minimum range operation frequency or operation ratio status (S1110).

If a temperature condition of the first storage chamber, which will depend on a condition of the compressor's operation or the increase of the compressor's operation frequency or operation ratio (a temperature condition of S1105) is, e.g., −18° C., a temperature condition restituting the compressor to its prior status may be a temperature which is lower than −18° C., for example, −25° C.

Figure 12:
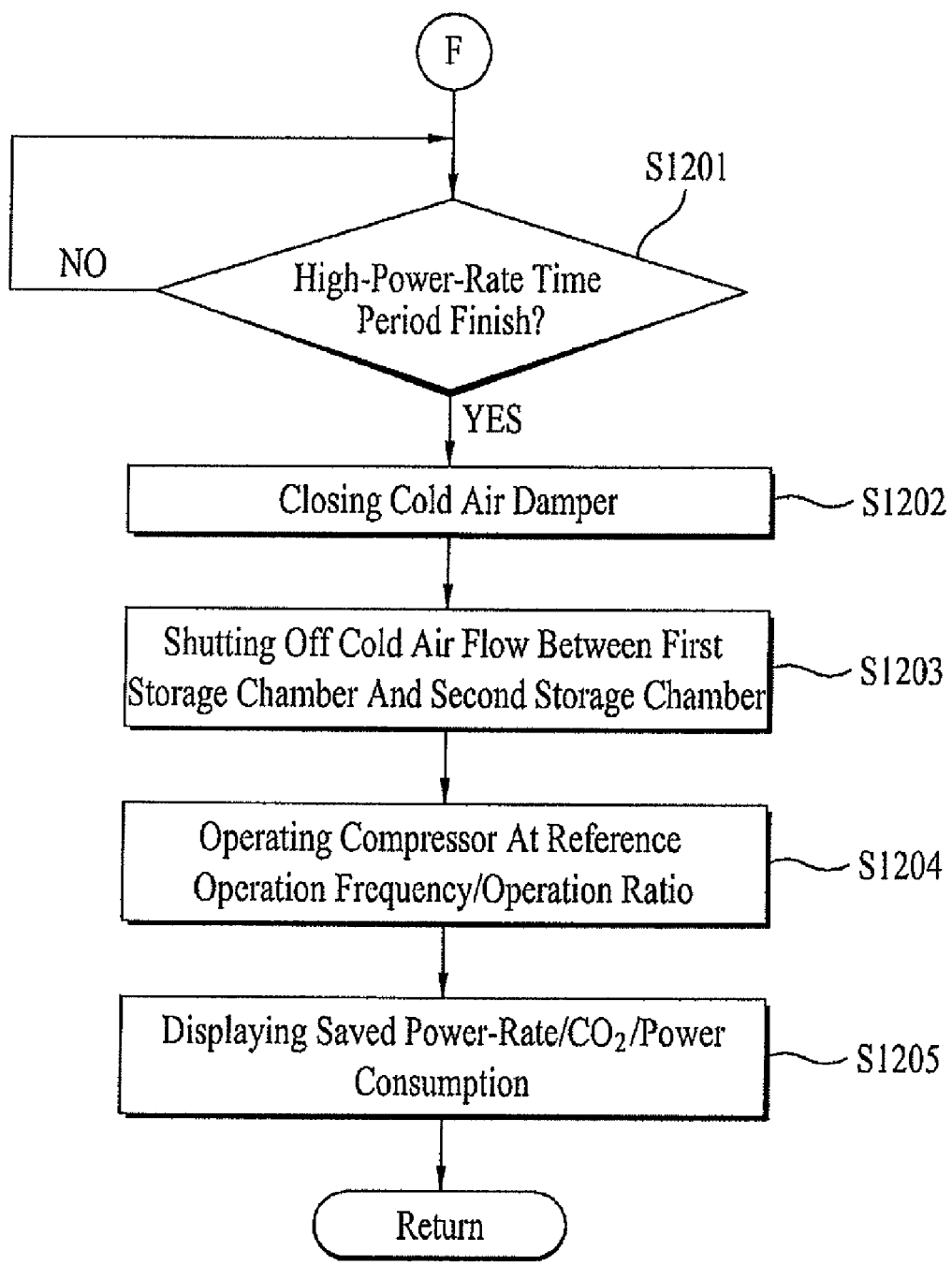

As shown in FIG. 12, it is determined whether the high-power-rate time period has passed (S1201). If it is determined that the high-power-rate time period has passed, the cold air damper is closed to fully separate the first and second storage chambers from each other (S1202 and S1203).

Hence, the compressor is operated at the reference operation frequency or operation ratio to compress refrigerant again and the refrigerant is supplied to the first and second storage chambers (S1204).

The display displays the power-rate saved by the above operation, the power consumption and the amount of carbon dioxide emitted. Further it may display the result of the power-saving operation directly to the user (S1205).

In reference to FIG. 13 and the next corresponding drawings, a second embodiment of the present invention using the auxiliary power supply will be described.

Figure 13:
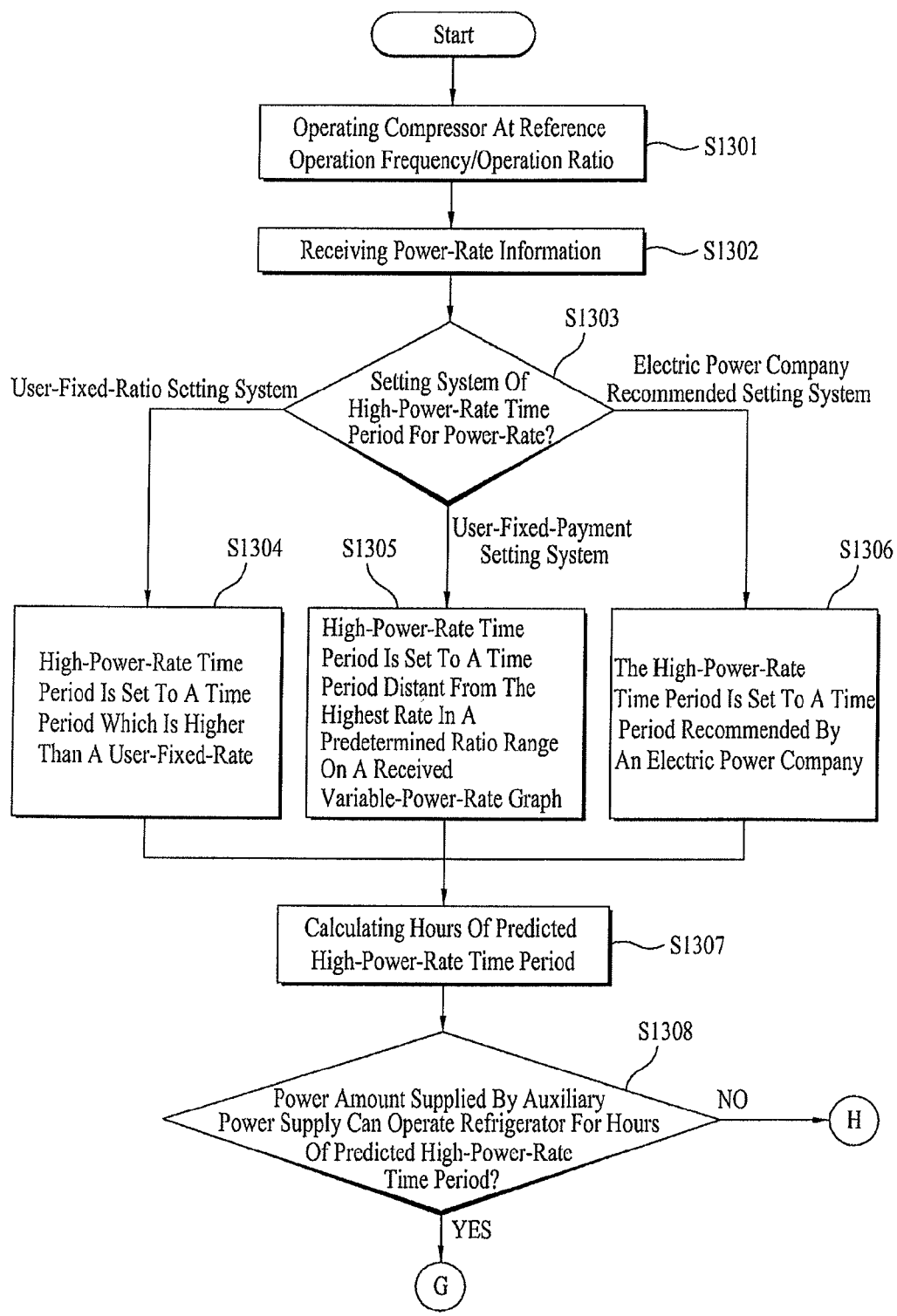
FIGS. 13 to 24 are flow charts illustrating control methods of the refrigerator according to a third embodiment of the present invention.

As shown in FIG. 13, the step of operating the compressor at the reference operation frequency or operation ratio when the refrigerator starts to operate (S1301), the step of receiving the power-rate information (S1302), the step of selecting a setting system of the power-rate with respect to the high-power-rate time period (S1303), and the step of setting the high-power-rate time using the user-fixed-ratio setting system (S1304), the user-fixed-payment setting system (S1305) or the electric-power-company-recommendation setting system (S1306) are identical or substantially identical to those of the first embodiment and thus the detailed description of them will be omitted accordingly for the sake of brevity.

After selecting one of the setting systems with respect to the high-power-rate time period, hours of the predicted high-power-rate time period are calculated (S1307).

If the hours of the predicted high-power-rate time period are calculated, it is determined whether the refrigerator can be operated by way of the power which is able to be supplied by the auxiliary power supply (e.g., 50 in FIG. 3), for example, a storage battery installed in a household, a fuel cell and a self-power-generation facility during the high-power-rate time period (S1208).

Figure 14:
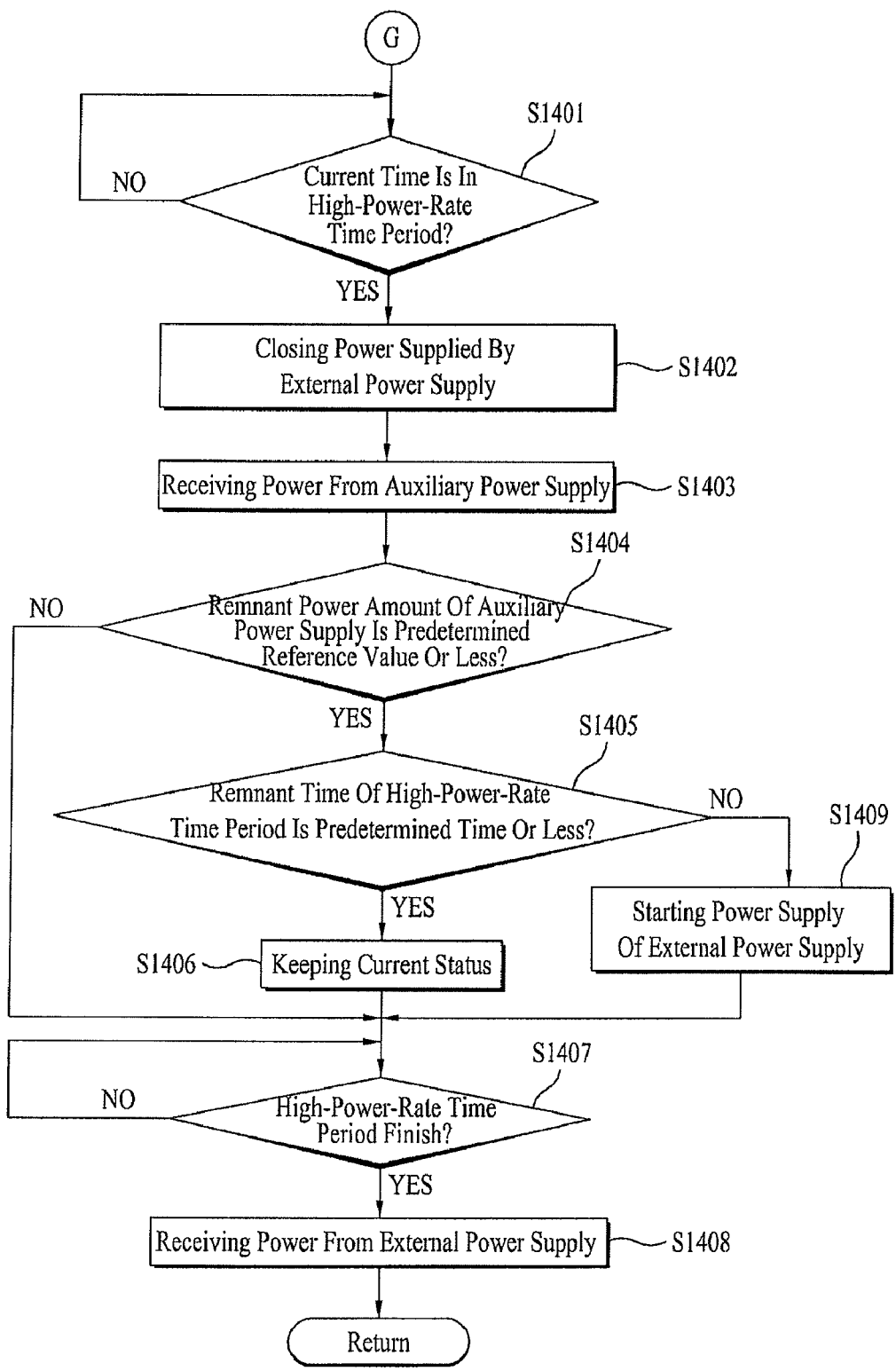

If it is determined that the power of the auxiliary power supply can operate the refrigerator during the high-power-rate time period, it is determined whether the current time is in the high-power-rate time period (S1401) as shown in FIG. 14.

Hence, if it is determined that the current time is in the high-power-rate time period, the power supply from the external power, for example, power supplied from an electric power company, is shut off (S1402) and the power supply from the auxiliary power supply is provided to the refrigerator (S1403).

Thereafter, the display of the refrigerator can display that the refrigerator may be operated in the high-power-rate time period and the alarm sound may be generated if the user holds the door handle. If the user opens the door, the storage chamber cold air leakage preventing device may be operated. The detailed description of these configurations and operations is identical to the above description according to the first embodiment and thus will be omitted accordingly.

While the step of determining whether the remnant power of the auxiliary power supply satisfies a predetermined criterion is performed (S1404), an increase of refrigerator load could increase unexpected power consumption and thus certain measures may be provided.

For instance, if it is determined that the remnant power of the auxiliary power supply is at the predetermined reference or less, it is determined whether the remnant time of the high-power-rate time period is at a predetermined time or less (S1405). The reason why it would be preferred to determine the remnant time is that several minutes of the remnant time would not generally damage the freezing and refrigerating function of the refrigerator severely even when the power is insufficient.

As such, if the remnant time determined to correspond to several minutes, the current status is kept (S1406). On the other hand, if the remnant time is determined to be at the predetermined time or more with insufficient cold air supply because the power is not supplied smoothly, the freezing or refrigerating function may not be properly provided in the refrigerator.

Because of that, in such a case, the power supplied from the external power supply is used and the power supply of the external power supply is provided to the refrigerator (S1409).

In this state, it is determined whether the high-power-rate time period has passed (S1407). If the high-power-rate time period has passed, the power is supplied by the external power supply like in the state before the high-power-rate time period (S1408).

If it is determined by S1307 shown FIG. 13 that the auxiliary power supply alone is not sufficient to operate the refrigerator adequately, it is determined whether the amount of power which can be supplied by the auxiliary power supply is at a predetermined value or more to determine sufficiency of the amount of the auxiliary power supply for the refrigerator (S1501). If so, a difference between the predicted power consumed in the high-power-rate time period and the power which can be supplied by the auxiliary power supply is calculated (S1502).

Hence, the difference between a predicted operation time of the refrigerator in the predicted high-power-rate time period and a predicted operation time of the refrigerator by way of the power which can be supplied by the auxiliary power supply is calculated (S1503).

The over-cooling operation time and temperature for generating cold air to be used for the difference of the operation times, are calculated (S1504). For example, the predicted operation time of the refrigerator in the high-power-rate time period is 3 hours and the operation time of the refrigerator operated normally by way of the power received from the auxiliary power supply is correspondingly to be provided.

The temperatures of the first and second storage chambers are kept at a common temperature, for example, −18° C. for 2 hours by way of the power received from the auxiliary power supply. If the power received from the auxiliary power supply is stopped for 1 hour after the 2 hours, the temperature of the first storage chamber will be increased.

At this time, if the external power is supplied for the 1 hour after the 2 hours, the power-rate will be increased which may not be desirable. On the other hand, the refrigerating function of the refrigerator needs to be maintained.

Because of that, over-cooled cold air is injected to the first and second storage chambers before the high-power-rate time period, for the temperature of the first storage chamber to be at the predetermined temperature or lower, for example, −18° C. and for the temperature of the second storage chamber to be 3° C. for the 1 hour after the 2 hours.

Here, in the current control flow, sufficient power can be supplied from the auxiliary power supply and thus it is preferable that the cooling time is shorter and that the over-cooling target temperature is relatively high, compared with a control flow which will be described later, that is, the condition of no more power being supplied from the auxiliary power supply.

It is determined whether the difference between the current time and the start point of the high-power-rate time period reaches the over-cooling time (e.g., the over-cooling time calculated at step S1504) (S1505). If the difference reaches the over-cooling operation time, the target temperature for the over-cooling operation is set and the operation frequency or operation ratio of the compressor is increased to accomplish the target temperature (S1506). For instance, the target temperature for the over-cooling operation may be set to equal the calculated over-cooling temperature obtained in step S1504.

Figure 16:
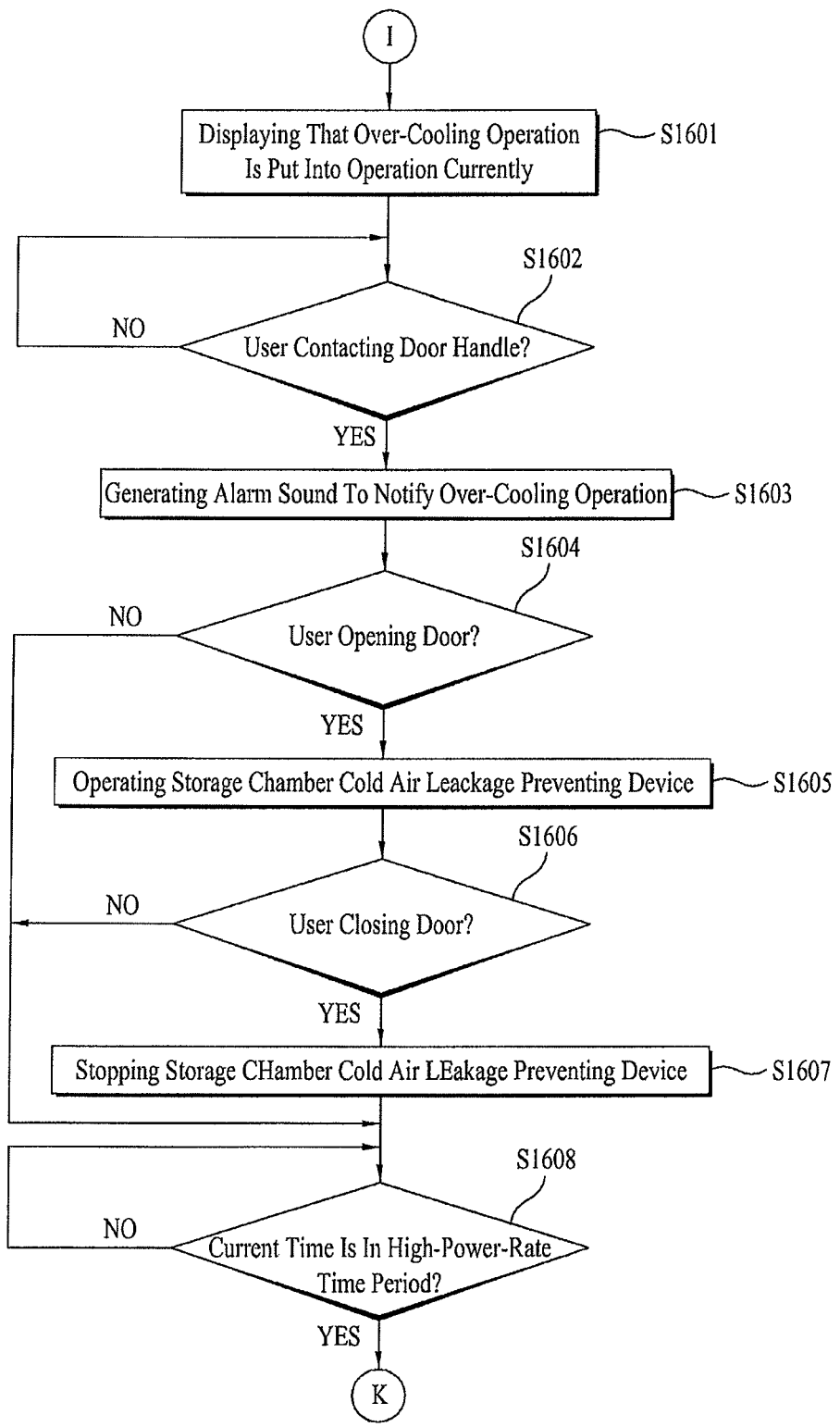

As shown in FIG. 16, the display displays that the over-cooling operation is implemented at the current time (S1601) and it is determined whether the user contacts the door such as holding the handle of the refrigerator door (S1602). If there is a contact, the alarm is generated to notify about the over-cooling operation (S1603).

If the user opens the door, the storage chamber cold air leakage preventing device is put into operation and if the user closes the door, the storage chamber cold air leakage preventing device is stopped (S1604-S1607).

Figure 17:
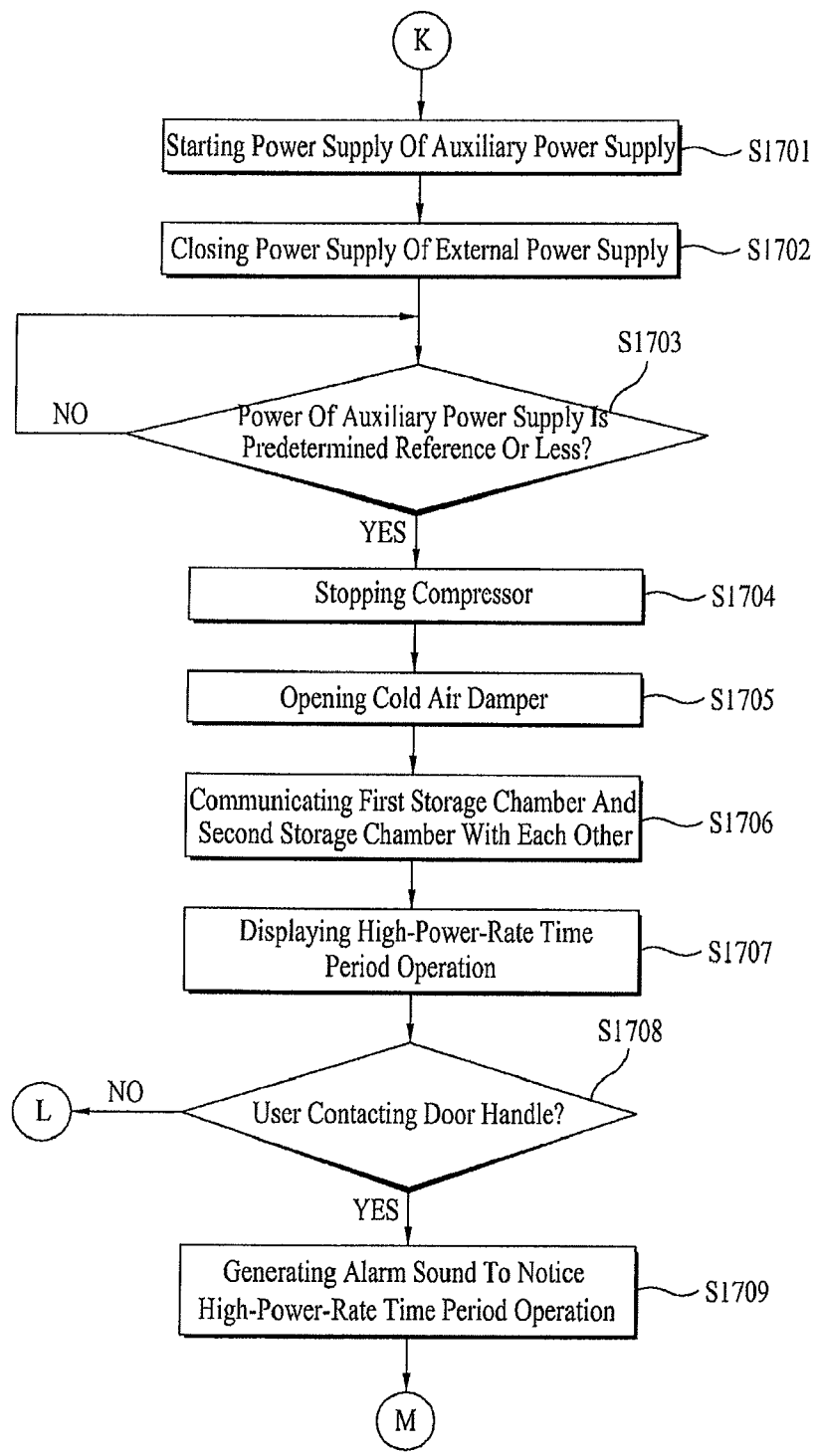

In the meanwhile, it is determined whether the current time enters the high-power-rate time period during the over-cooling operation (S1608). If the current time enters the high-power-rate time period, the power from the auxiliary power supply is supplied and starts to be used as shown in FIG. 17 and the power from the external power supply is closed and no longer supplied to the refrigerator (S1702).

It is determined whether the power able to be supplied by the auxiliary power supply is at a predetermined reference value, for operating the compressor to operate the refrigerator by way of the power of the auxiliary power supply in this status (S1703). This step allows the refrigerator to check whether the power of the auxiliary power supply is insufficient.

Hence, if the power of the auxiliary power supply is at a predetermined reference amount or less (e.g., almost zero), the compressor is stopped and the cold air damper is open to allow the cold air inside the first and second storage chambers to flow through each other (S1704-S1707).

Hence, the display displays that the refrigerator is operating in the high-power-rate time period currently (S1707).

Figure 18:
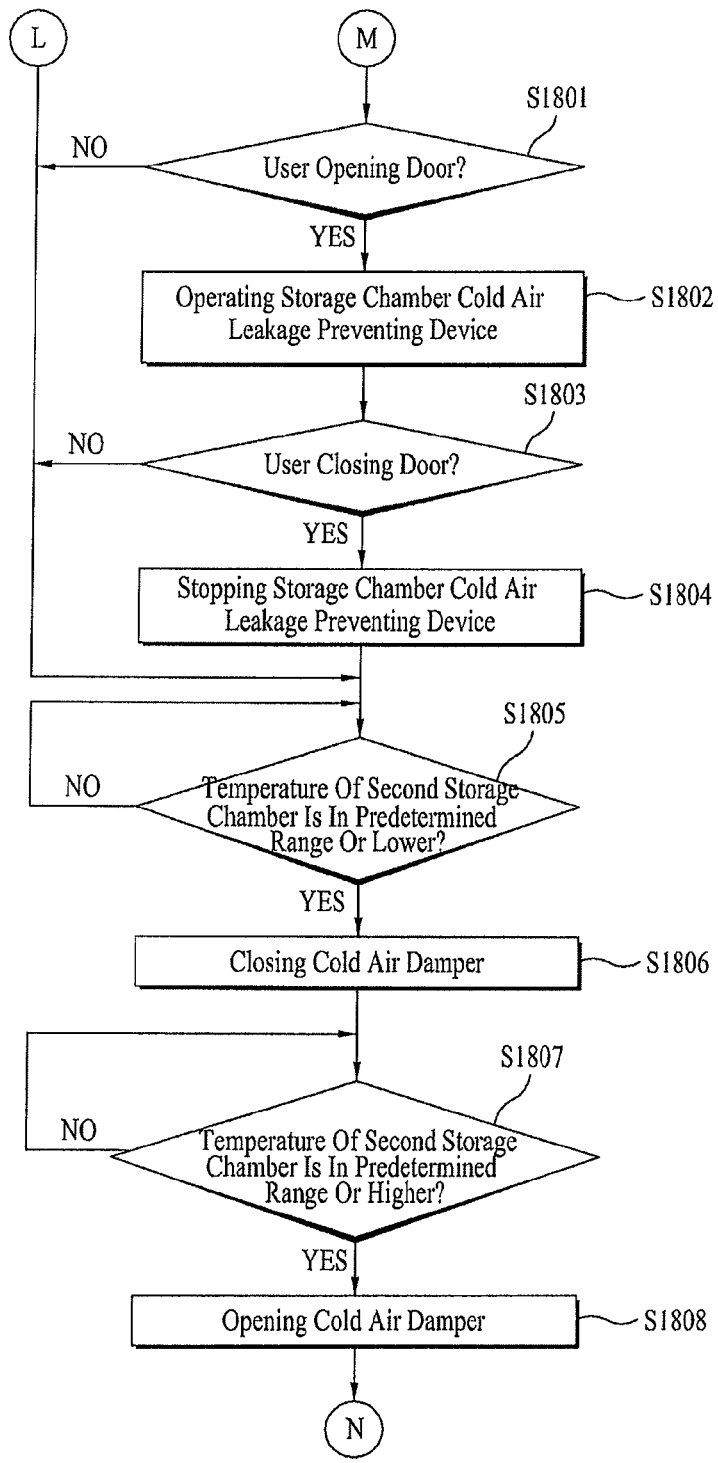

In case there is a door contact such as the user's holding of the refrigerator door handle, the alarm is generated to notify about the door contact to warn the user (S1708-S1709). If there is the user's opening of the refrigerator door as shown in FIG. 18, the storage chamber cold air leakage preventing device is operated and if the door is closed, the storage chamber cold air leakage preventing device is stopped, to prevent the leakage of the cold air inside the first and second storage chambers (S1801-S1804).

In the meanwhile, if the temperature of the second storage chamber provided with the cold air by the first storage chamber is at a predetermined range of temperatures or lower, the cold air damper is closed to prevent the cold-air damage to the objects stored in the refrigerator, such that cold air passage between the first and second storage chambers may be closed or reduced (S1805-S1806).

If the temperature of the second storage chamber is within a predetermined range or higher in this state, the cold air damper is re-opened to make the first and second storage chambers communicate with each other (S1807-S1808). The operational state of this cold air damper is shown in FIG. 26(c).

Figure 19:
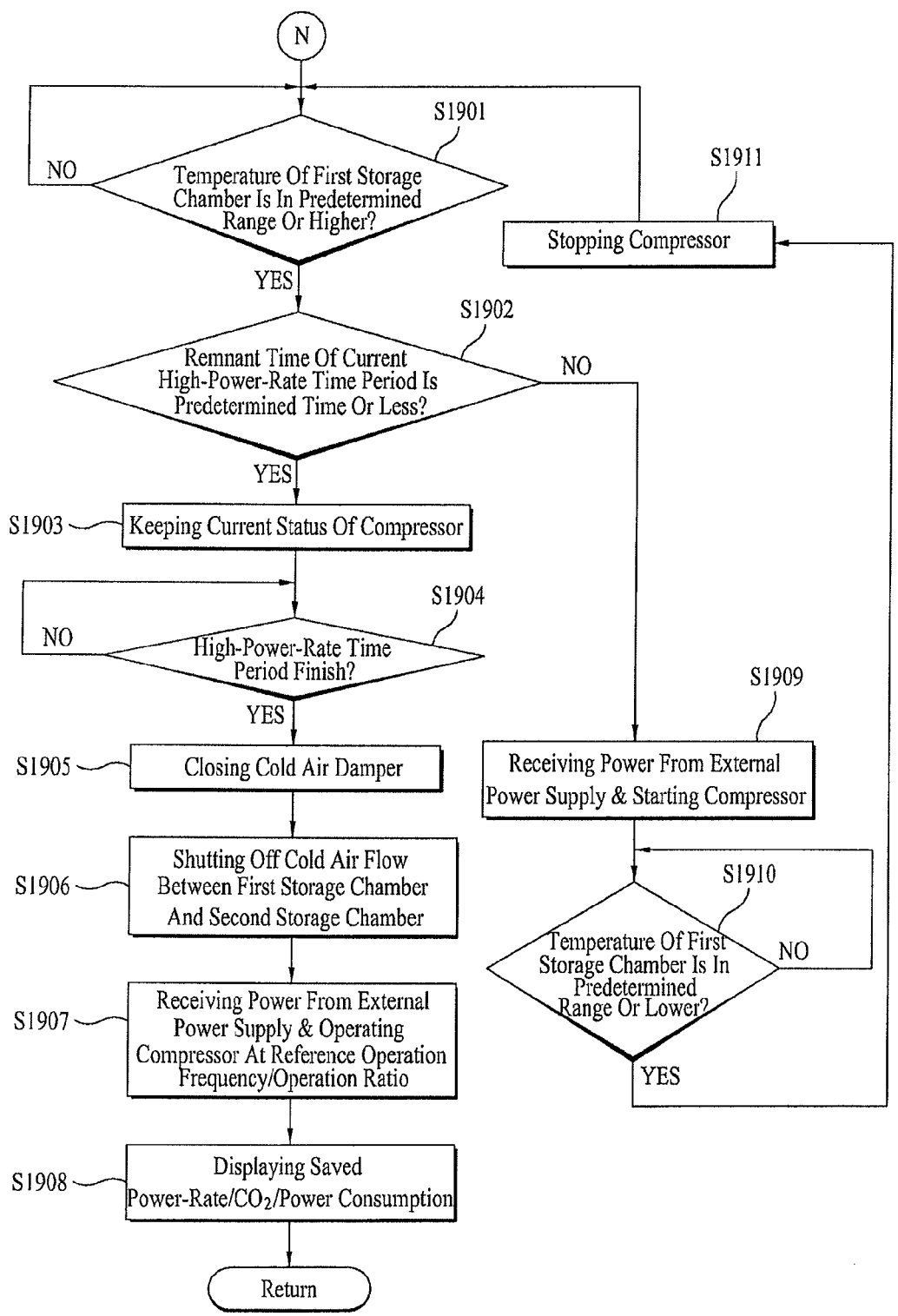

As shown in FIG. 19, if the temperature of the first storage chamber is within a predetermined range or higher (S1901), the supply of the cold air is necessary. Here, in case the remnant time of the high-power-rate time period is not so much, this stop state of the compressor may be maintained and the preserving function may be implemented by using the remnant cold air (S1902-S1903).

However, if the remnant time is within the predetermined range or more at step S192, the cold air is supplied by the operation of the compressor and the power supplied by the external power supply is used to start the compressor to implement the compression (S1909).

If this compressor's compression of refrigerant and the cold air supply decrease the temperature of the first storage chamber to a predetermined range or lower, the compressor is stopped (S1910 and S1911).

In case the high-power-rate time period finishes during the above controlling operation (S1904), the cold air damper is closed (S1905) and the cold air flow between the first and second storage chambers is shut off (S1906).

Hence, the power is supplied by the external power supply and the compressor is operated at the reference operation frequency or operation ratio (S1907). Here, it is preferable that information about the power rate saved by the above controlling operation, the power consumption and the reduced $CO_2$ emission is displayed on the display of the refrigerator or to another entity such as a controlling device at a Smart Grid center (S1908).

Figure 15:
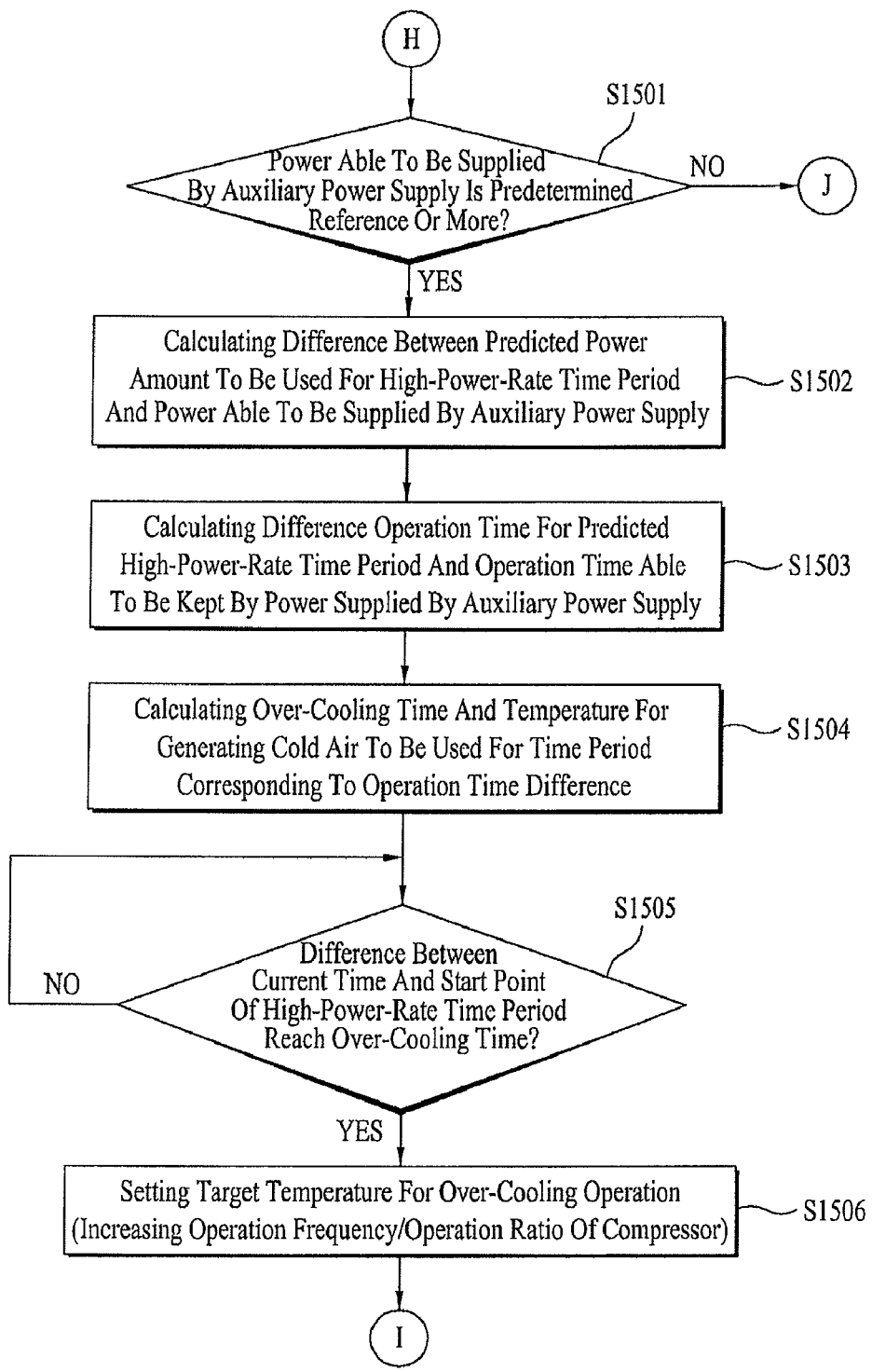

In case it is determined that the amount of power which can be supplied by the auxiliary power supply in S1501 shown in FIG. 15 is at a predetermined reference amount or less, the refrigerator is operated in the state of not being provided with the auxiliary power.

Figure 20:
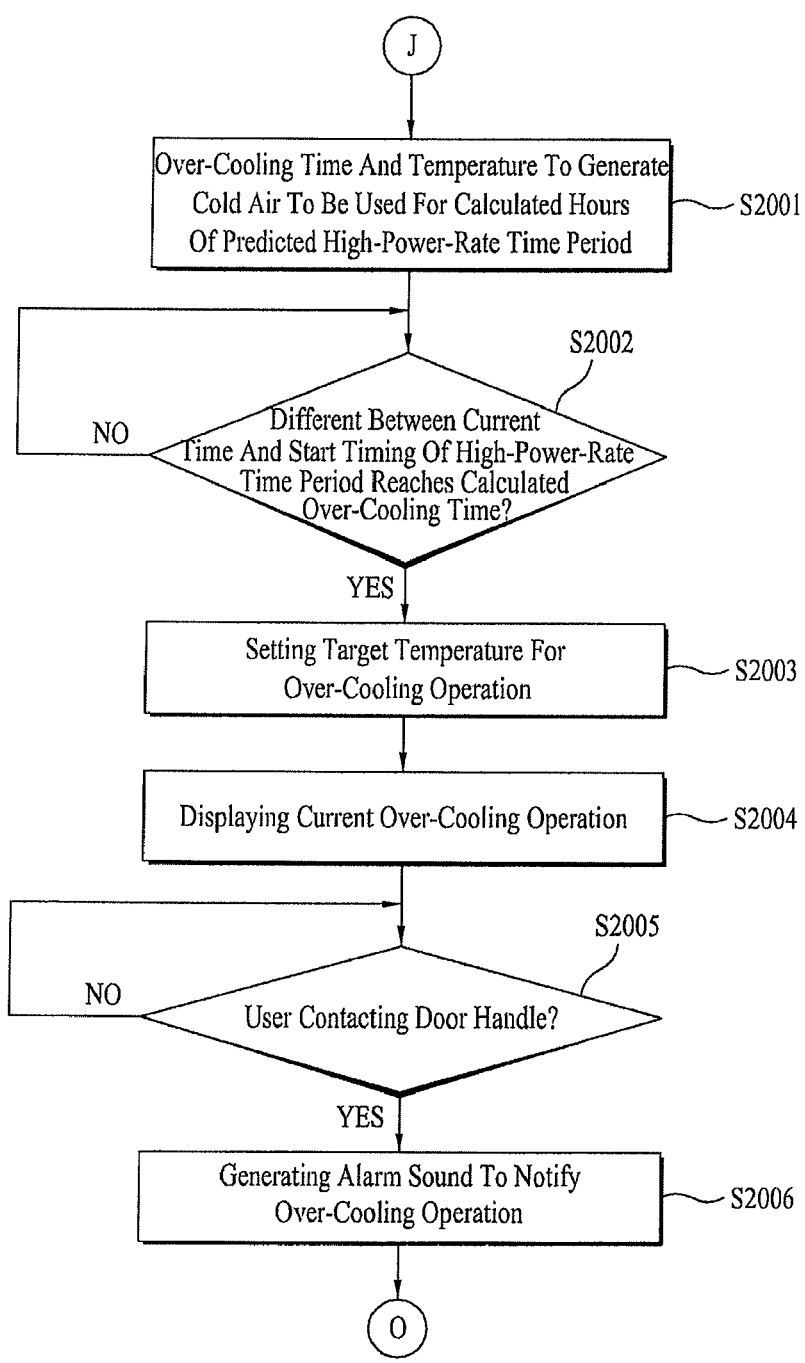

As shown in FIG. 20, the over-cooling operation time for the first storage chamber and the over-cooled target temperature are calculated to generate the cold air which will be used during the predicted high-power-rate time period calculated in S1306 shown in FIG. 13 (S2001).

Hence, it is determined whether the difference between the current time and the start timing of the high-power-rate time period reaches the over-cooling operation time (S2002). That is, in case the over-cooling operation time is 30 minutes, it is determined whether the current time is 30 minutes before the start of the high-power-rate time period.

If the over-cooling operation has to be implemented based on the result of the determination, the target temperature for the over-cooling operation is set according to the calculated target temperature and the operation frequency or operation ratio of the compressor is increased (S2003). The display displays that the over-cooling operation is implemented currently (S2004) and in case there is a door contact by the user (S2005), the alarm is generated to notify the user about the over-cooling operation currently occurring in the refrigerator (S2006).

Figure 21:
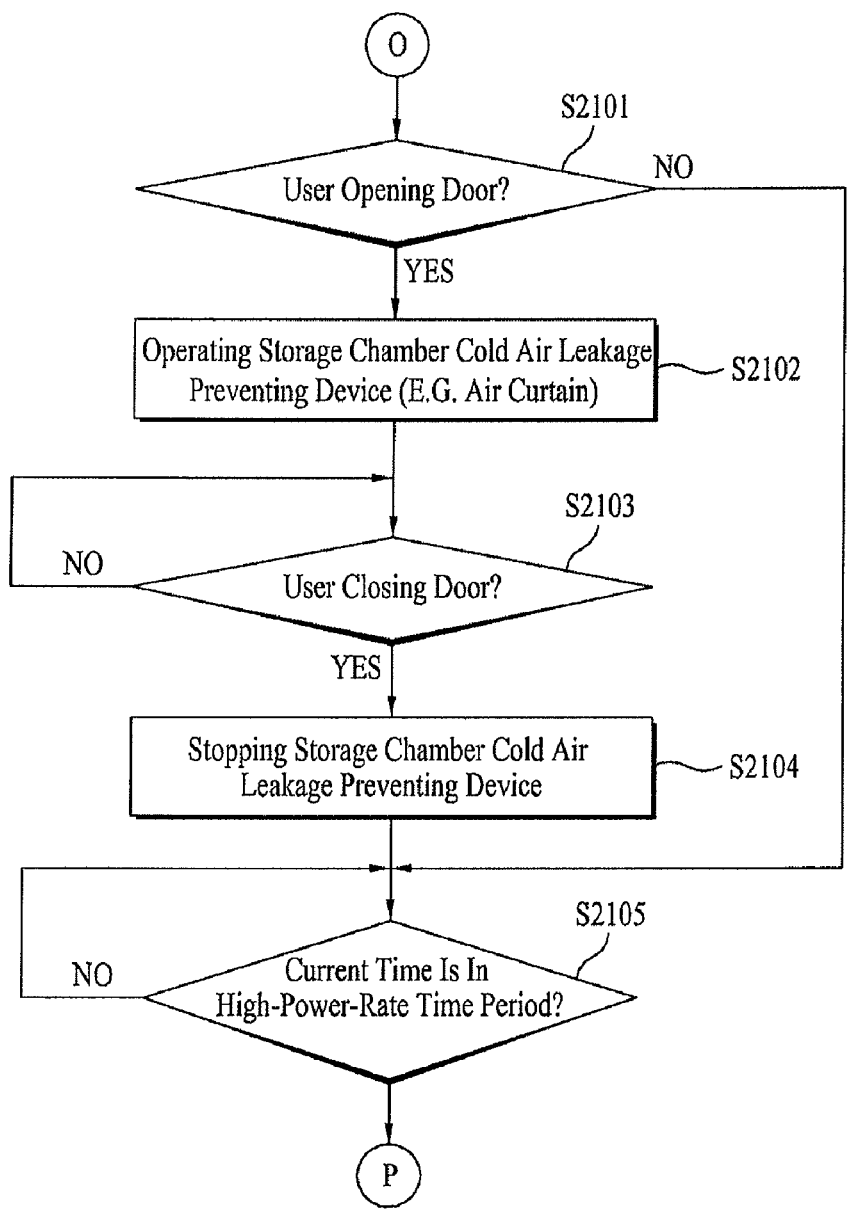

If the user opens the door as shown in FIG. 21 (S2101) even after being notified about the over-cooling operation, the storage chamber cold air leakage preventing device is put into operation to form an air curtain and the cold air of the first storage chamber is stopped from flowing outside and vice versa (S2102).

If the door is closed after being opened, the storage chamber cold air leakage preventing device is stopped (S2104).

Figure 22:
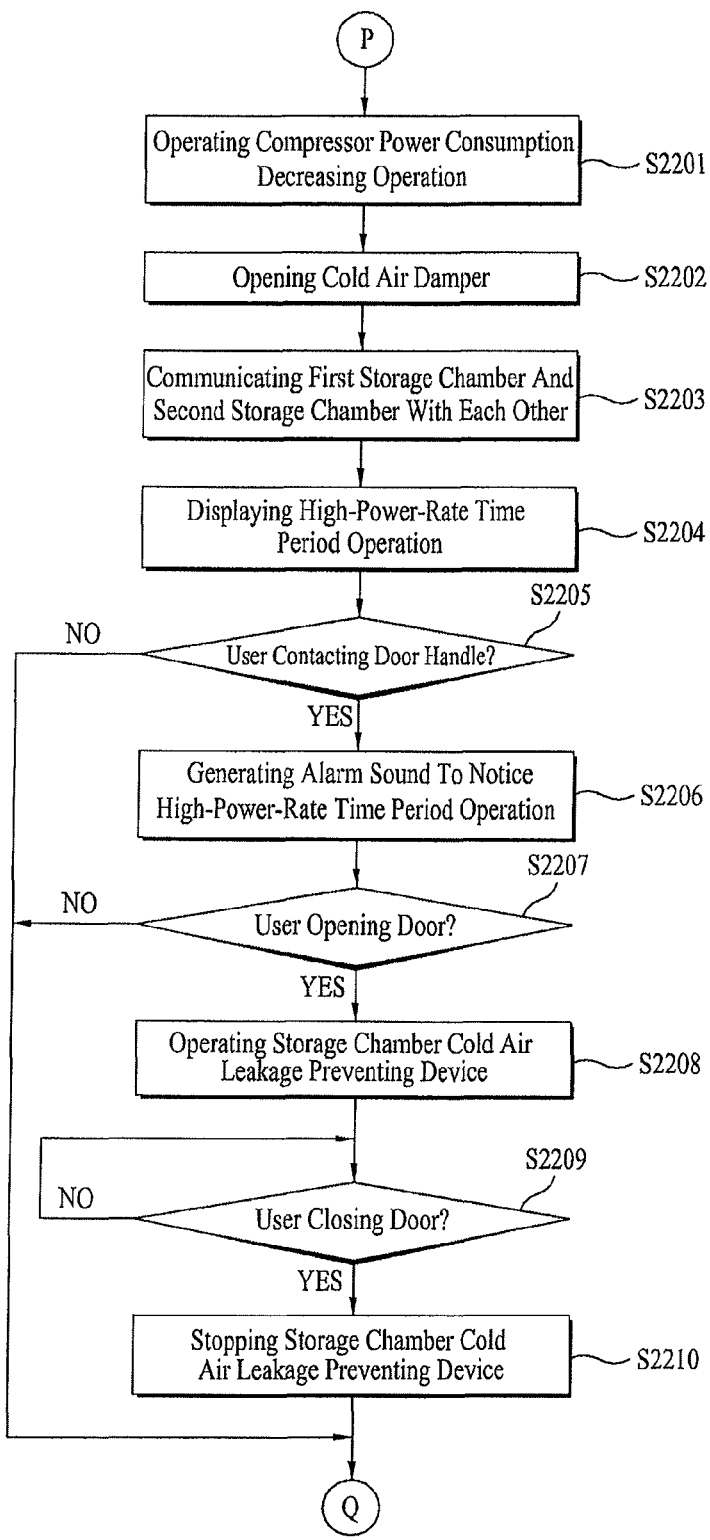

It is determined whether the current time belongs to the high-power-rate time period during this operation (S2105). If the current time is within the high-power-rate time period based on the result of the determination, the compressor power consumption decreasing operation starts as shown in FIG. 22. Here, the compressor may be stopped or it may be operated at the least operation frequency (S2201).

Hence, the cold air damper is opened to make the first and second storage chambers to communicated with each other (S2202 and S2203) and is the display displays that the refrigerator is operating currently in the high-power-rate time period (S2204).

In case the user contacts the door handle of the refrigerator door (S2205), the alarm is generated to notify the user about the operation in the high-power-rate time period (S2206).

If the user opens the refrigerator door, the storage chamber cold air leakage preventing device is put into operation to prevent the cold air of each storage chamber from flowing outside or to prevent external air from flowing into the storage chamber. If the refrigerator door is closed, the storage chamber cold air leakage preventing device is stopped (S2207-S2210).

Figure 23:
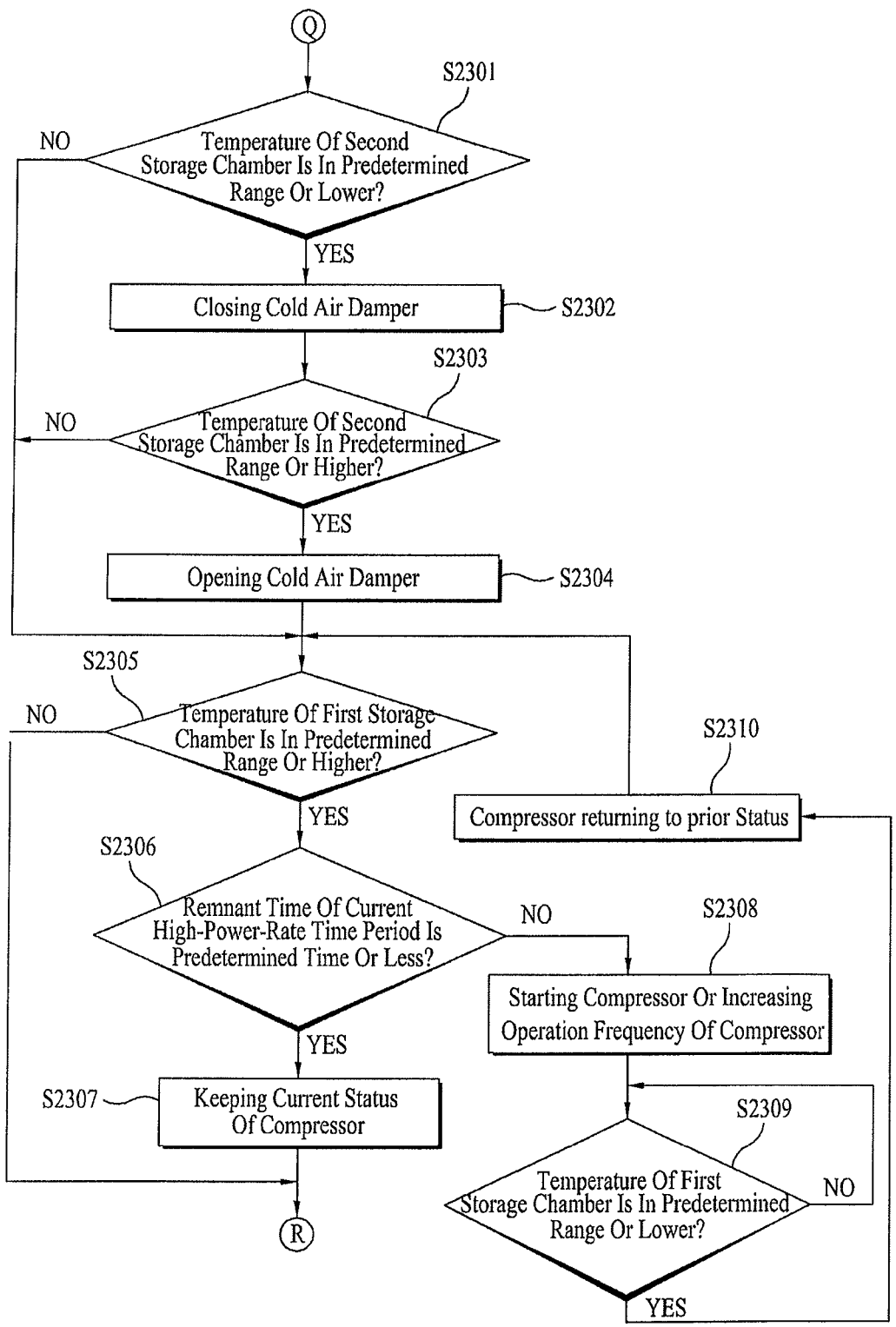

If the temperature inside the second storage chamber functioning as the refrigerating chamber as shown in FIG. 23 is within a predetermined range or lower (S2301), the cold air damper is closed to prevent the objects being stored in the refrigerator from being frozen or cold-air damaged. As a result, the air communication between the first and second storage chambers is closed to prevent the cold air from flowing into the second storage chamber (S2302).

In case the temperature of the second storage chamber determined to be within a predetermined range or higher under this condition, the cold air damper is opened to decrease the temperature. As a result, the first and second storage chambers communicate with each other to allow the cold air of the first storage chamber to flow into the second storage chamber (S2303 and S2304).

It is determined whether the temperature of the first storage chamber is within the predetermined range or higher (S2305). If the temperature of the first storage chamber is determined to be within the predetermined range or higher based on the result of the determination, it is determined whether the remnant time of the current high-power-rate time period is at a predetermined time or less (S2306).

If the remnant time is determined to be at the predetermined value or less based on the result of the determination, the compressor's current status which is the stopped status, or the operational state of the compressor at the least operation frequency or operation ratio because of the economical aspect, is maintained (S2307).

However, if the remnant time is determined to be more the predetermined value based on the result of the determination at step S2306, the compressor is operated by way of the power supplied by the external power supply or the operation frequency or operation ratio of the compressor is increased (S2308). In case the temperature of the first storage chamber is decreased to be within a predetermined rage or lower because of the above operation, the compressor returns to its prior status, which is the compressor's stopped status or the compressor's operation at the least operation frequency or operation ratio (S2309 and S2310).

Figure 24:
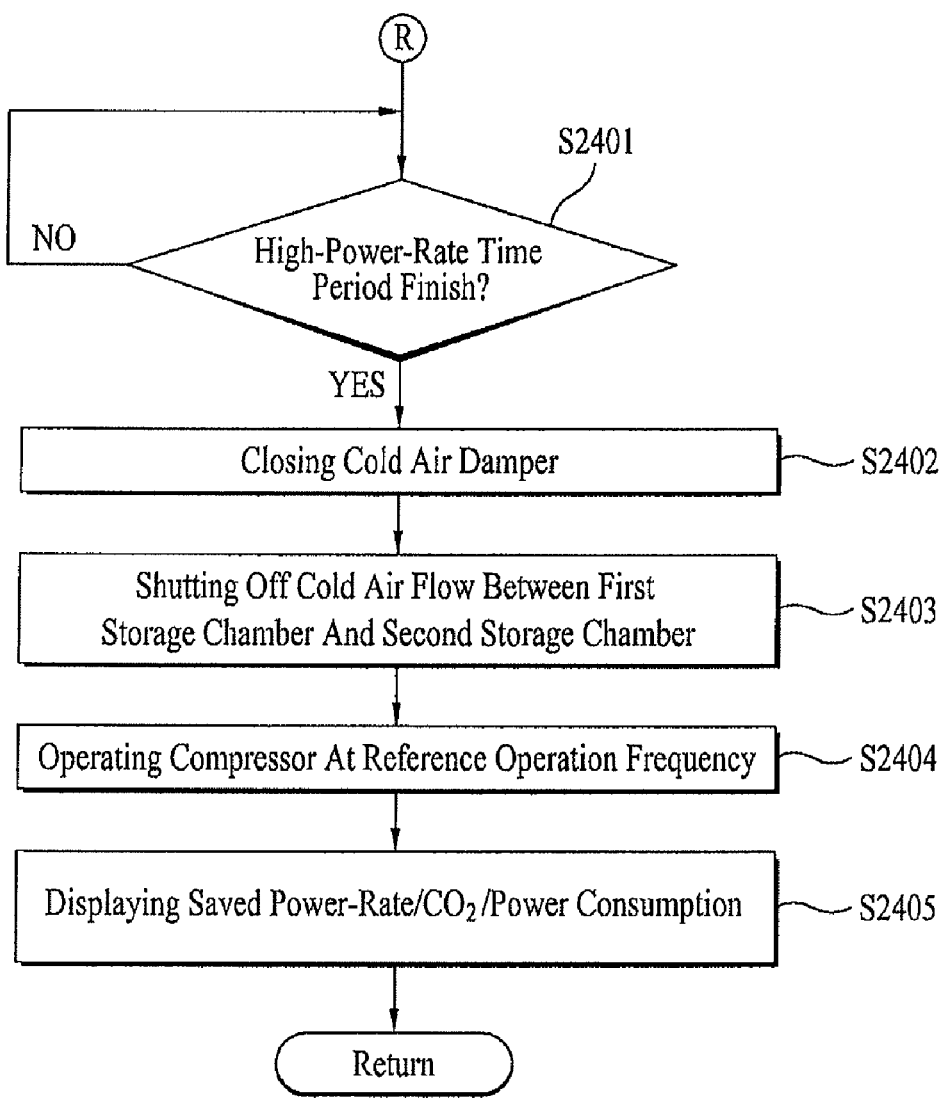

As shown in FIG. 24, in case the high-power-rate time period has ended based on the result of determination (S2401), the cold air damper is closed and the air flow between the first and second storage chambers is shut off (S2402 and S2403).

Hence, the compressor is put into operation at the reference operation frequency or operation ratio (S2404). Information about the saved power-rate, the power consumption and the reduced $CO_2$ emission may be displayed on the display of the refrigerator or the display connected to the refrigerator (S2405).

Although the above examples of the invention are directed to a refrigerator, the invention is not limited thereto and can be applied to other electric/electronic appliances such as an air conditioner, a freezer, a cooler, etc. or to other devices that provide a cooling function using electricity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A refrigerator comprising:
   a plurality of storage chambers including at least one first storage chamber and at least one second storage chamber;
   a power-rate information receiving part connected to a smart grid network and configured to receive power-rate information from the smart grid network;
   a period setting part configured to set an over-cooling period and a power-saving period based on the received power-rate information;
   an over-cooling controller configured to generate over-cooled cold air in the at least one first storage chamber during the over-cooling period; and
   a power-saving controller configured to cool the at least one second storage chamber in the power-saving period by selectively directing the over-cooled cold air from the at least one first storage chamber to the at least one second storage chamber during the power-saving period.

2. The refrigerator of claim 1, wherein the power-saving period is set based on a high-power-rate time period identified in the received power-rate information.

3. The refrigerator of claim 2, wherein the over-cooling period is set based on a time needed to maintain the set power-saving period and a time needed for the over-cooling.

4. The refrigerator of claim 1, further comprising:
   a cold air damper configured to moving the cold air of the over-cooled storage chamber to the at least one second storage chamber.

5. A method for managing use of electric power in a refrigerator of a smart grid system, the refrigerator including at least one first storage chamber and at least one second storage chamber, the method comprising:
   receiving, by the refrigerator, power-rate information from a smart grid network;
   setting an over-cooling period and a power-saving period based on the received power-rate information;
   supplying over-cooled cold air to the at least one first storage chamber of the refrigerator during the over-cooling period; and
   selectively directing the over-cooled cold air from the at least one first storage chamber to the at least one second storage chamber during the power-saving period.

6. The method of claim 5, wherein the power-saving period is set based on a high-power-rate time period identified in the received power-rate information.

7. The method of claim 6, wherein the over-cooling period is set based on a time needed to maintain the set power-saving period and a time needed for the over-cooling.

8. The method of claim 5, further comprising a step of:
controlling an opening and closing of a cold air damper of the refrigerator to move the cold air of the over-cooled storage chamber to the at least one second storage chamber.

9. An electric appliance comprising:
a cabinet including a plurality of storage chambers;
at least one cold air damper provided between the storage chambers to selectively open or close an air passage path between the storage chambers;
a controller cooperating with the cold air damper and configured to:
receive power-rate information,
set an over-cooling period and a power-saving period based on the received power-rate information,
control at least one of the storage chambers to be over-cooled by generating over-cooled cold air during the over-cooling period, and
control at least one of the other storage chambers to be cooled by the over-cooled cold air from the over-cooled storage chamber by selectively opening and closing the air passage path using the cold air damper during the power-saving period.

10. The electric appliance of claim 9, wherein the plurality of the storage chambers comprise a first storage chamber and a second storage chamber having a temperature kept relatively higher than a temperature of the first storage chamber, and
wherein the controller over-cools the first storage chamber to decrease the temperature of the first storage chamber to a certain level a predetermined time before the power-saving period starts.

11. The electric appliance of claim 10, wherein the controller controls the cold air damper provided between the first and second storage chambers to be opened if a current time enters the power-saving period, and
the controller controls the cold air damper to be opened or closed repeatedly to control the temperature of the second storage chamber to be within a predetermined range during the power-saving period.

12. The electric appliance of claim 9, further comprising:
a sensor configured to detect whether a user contacts a door of the electric appliance;
a display configured to display information about an operational status of the refrigerator; and
an alarm configured to generate an audio signal,
wherein the controller displays information indicating an operation performed during each of the over-cooling period and the power-saving period on the display, and the controller operates the alarm when the sensor detects that the user has contacted the door of the electric appliance.

13. The electric appliance of claim 12, further comprising:
a storage chamber cold air leakage preventing device provided in at least one of the storage chambers, the storage chamber cold air leakage preventing device comprising a spray nozzle for spraying air to prevent leakage of the over-cooled cold air inside the corresponding storage chamber,
wherein the storage chamber cold air leakage preventing device sprays air to form an air curtain between an inside and an outside of the corresponding storage chamber, when the door is opened.

14. The electric appliance of claim 9, further comprising:
a user alerting unit configured to alert a user that the over-cooling of the at least one of the storage chambers is occurring in the electric appliance, when the user contacts a door of the electric appliance.

15. The electric appliance of claim 9, wherein the power-saving period is set to be:
a time period recommended by an electric power company,
a time period in which a recommended power-rate band is formed,
a time period which is higher than a user-fixed-rate, or
a time period distant from the highest rate in a predetermined ratio range based on received variable-power-rate system information.

16. A control method of a refrigerator including storage chambers, the method comprising steps of:
receiving power-rate information;
identifying a high-power-rate time period in which a hourly-power-rate is to be billed at a predetermined amount or more;
over-cooling, by the refrigerator, at least one of the storage chambers provided in the refrigerator when a current time is at a predetermined time before the high-power-rate time period;
decreasing, by the refrigerator, a power consumption of the refrigerator when the current time is within the high-power-rate time period; and
providing, by the refrigerator, an air passage between the over-cooled storage chamber and at least another of the storage chambers when the current time is within the high-power-rate time period.

17. A control method of a refrigerator including storage chambers, the method comprising steps of:
receiving power-rate information;
identifying a high-power-rate time period in which a hourly-power-rate is to be billed at a predetermined amount or more;
determining whether a power needed to operate the refrigerator during the high-power-rate time period is able to be supplied by an auxiliary power supply;
receiving, by the refrigerator, the power from the auxiliary power supply during the high-power-rate time period if the determining step determines that the power is able to be supplied by the auxiliary power supply; and
if the determining step determines that the power is not able to be supplied by the auxiliary power supply, providing by the refrigerator an air passage between the storage chambers when the high-power-rate time period starts, after over-cooling at least one of the storage chambers before the high-power-rate time period.

18. The control method of claim 17, further comprising:
during the over-cooling of the at least one of the storage chambers, outputting, by the refrigerator, operation status information to alert a user about the over-cooling, when the user contacts a door of the refrigerator.

19. A refrigerator comprising:
a plurality of storage chambers;
a power supply control unit configured to direct power from either an auxiliary power supply or a main power supply; and
a controller cooperating with the power supply control unit and configured to:
receive power-rate information;

identify a high-power-rate time period in which a hourly-power-rate is to be billed at a predetermined amount or more;

determine whether a power needed to operate the refrigerator during the high-power-rate time period is able to be supplied by the auxiliary power supply;

receive the power from the auxiliary power supply during the high-power-rate time period if the controller determines that the power is able to be supplied by the auxiliary power supply; and if the controller determines that the power is not able to be supplied by the auxiliary power supply, provide an air passage between the storage chambers when the high-power-rate time period starts, after over-cooling at least one of the storage chambers before the high-power-rate time period.

20. The refrigerator of claim 19, further comprising:

an output unit configured to, during the over-cooling of the at least one of the storage chambers, output operation status information to alert a user about the over-cooling, when the user contacts a door of the refrigerator.

\* \* \* \* \*